United States Patent
Abe et al.

(10) Patent No.: US 6,996,328 B2
(45) Date of Patent: Feb. 7, 2006

(54) MAGNETIC TAPE RECORDING APPARATUS AND METHOD, MAGNETIC TAPE PLAYBACK APPARATUS AND METHOD, FORMAT FOR MAGNETIC TAPE, AND STORAGE MEDIUM PRODUCT

(75) Inventors: Fumiyoshi Abe, Kanagawa (JP); Yoichiro Tauchi, Saitama (JP); Yasutaka Kotani, Tokyo (JP); Toshinori Kozai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1081 days.

(21) Appl. No.: 09/827,381

(22) Filed: Apr. 4, 2001

(65) Prior Publication Data

US 2002/0003947 A1    Jan. 10, 2002

(30) Foreign Application Priority Data

Apr. 6, 2000    (JP)    ............................. 2000-104838

(51) Int. Cl.
*H04N 5/91*    (2006.01)

(52) U.S. Cl. ..................... 386/95; 386/112; 386/124

(58) Field of Classification Search ................ 386/46, 386/54, 95, 96, 67, 103, 111, 112, 124; 380/203
See application file for complete search history.

(56) References Cited

U.S. PATENT DOCUMENTS

| | | | | |
|---|---|---|---|---|
| 5,987,126 A | * | 11/1999 | Okuyama et al. | ............ 380/203 |
| 6,026,212 A | * | 2/2000 | Oguro | .......................... 386/67 |
| 6,658,195 B1 | * | 12/2003 | Senshu et al. | ................. 386/54 |

* cited by examiner

*Primary Examiner*—Huy Nguyen
(74) *Attorney, Agent, or Firm*—Frommer Lawrence & Haug LLP; William S. Frommer; Darren M. Simon

(57) ABSTRACT

Pictures in number indicated by a value (3 in one example) of M in a GOP structure are set as one unit. AUX data (denoted by U in FIG. 32) related to those pictures, audio data (denoted by A in FIG. 32) corresponding to those pictures, and AUX data (denoted by X in FIG. 32) related to the audio data are arranged together at the head of 16 tracks that undergo interleaving. Subsequent to those data, one unit of pictures (3 pictures in one example) is arranged. An HD video signal and an HD audio signal can be recorded and played back with certainty.

7 Claims, 30 Drawing Sheets

| RUN PATTERN | Codeword | |
|---|---|---|
| | MSB | LSB |
| PATTERN A | 0 0 0 1 1 1 0 0 0 1 1 1 0 0 0 0 1 1 1 0 0 0 1 1 |
| PATTERN B | 1 1 1 0 0 0 1 1 1 0 0 0 1 1 1 1 0 0 0 1 1 1 0 0 |

FIG. 11

| | TYPES OF MAIN DATA DETAILS | | DETAILS | | | | |
|---|---|---|---|---|---|---|---|
| b7 | b6 | b5 | b4 | b3 | b2 | b1 | b0 |
| 0 | PES-VIDEO | | F/P | Continuity counter | | | |
| 1 | PES-AUDIO | | F/P | Continuity counter | | | |
| 2 | SEARCH | | V/A | Search speed | | | Res |
| 3 | AUX | | AUX mode | | | Reserved | |
| 4 | TS-1H | | Jump Flag | | Time Stamp | | |
| 5 | TS-2H | | Continuity counter | | | | |
| 6 | NULL | | Reserved | | | | |
| 7 | Reserved | | Reserved | | | | |

P/F: Partial/Full
V/A: video/audio

FIG. 12

SEARCH SPEED
    0 : RESERVED
    1 : 4-TIME SPEED
    2 : 8-TIME SPEED
    3 : RESERVED
    4 : 16-TIME SPEED
    5 : 32-TIME SPEED
  6-7 : RESERVED

FIG. 13

AUX MODE
    0 : AUX-V    (RELATED TO VIDEO)
    1 : AUX-A    (RELATED TO AUDIO)
    2 : PES-PSI 1  (PSI 1ST HALF)
    3 : PES-PSI 2  (PSI 2ND HALF)
    4 : SYSTEM    (EDIT INF ETC.)
  5-7 : RESERVED

FIG. 14

| KEY WORD | CLASS | DESCRIPTION |
|---|---|---|
| 0 | SUB | TTC |
| 1 | SUB | Binary Group |
| 2 | SUB | PART No. |
| 3 | SUB | CHAPTER START |
| 4 | SUB | ATNF (ATN+FLG) |
| 5 | SUB | REC data |
| 6 | SUB | REC time |
| 7 | SUB | Reserved |
| 8 | RES. | Reserved |
| : | RES. | Reserved |
| 63 | RES. | Reserved |

FIG. 15

| KEY WORD | CLASS. | DESCRIPTION |
|---|---|---|
| 64 | AUD. | AUD-FRAME |
| 65 | AUD. | Reserved |
| 66 | AUD. | Reserved |
| 67 | AUD. | Reserved |
| 68 | VID. | VID-FRAME |
| 69 | VID. | Reserved |
| 70 | VID. | Reserved |
| 71 | VID. | Reserved |
| 72 | A/V | UMID |
| 73 | A/V | Reserved |
| 74 | A/V | Reserved |
| 75 | A/V | Reserved |
| 76 | A/V | ASCII character message |
| 77 | A/V | shift JIS message |
| 78 | A/V | compressed data (text) |
| 79 | A/V | compressed data (binary) |
| 80 | SYS. | ECCTB |
| 81 | SYS. | Reserved |
| 82 | SYS. | Reserved |
| 83 | SYS. | Reserved |
| 84 | RES. | Reserved |
| : | RES. | Reserved |
| 127 | RES. | Reserved |

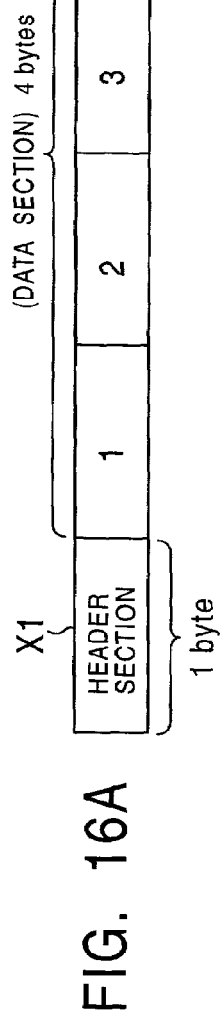
FIG. 16A
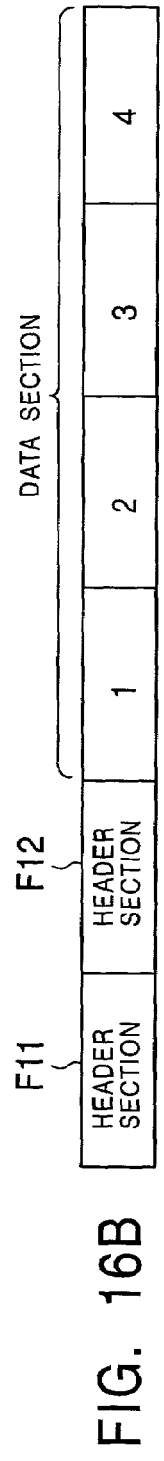
FIG. 16B
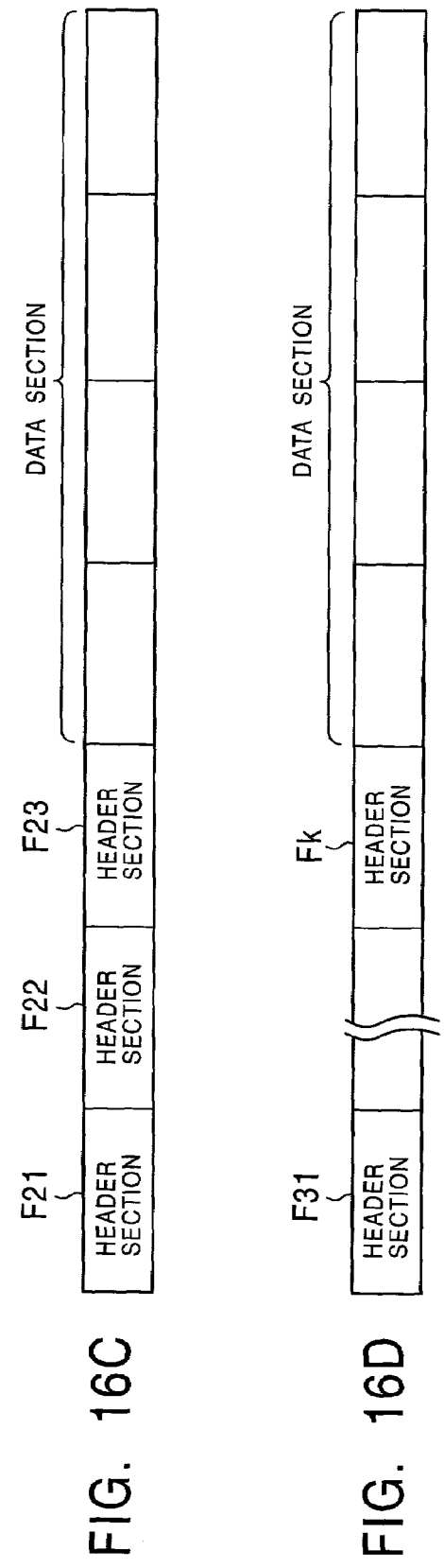
FIG. 16C
FIG. 16D

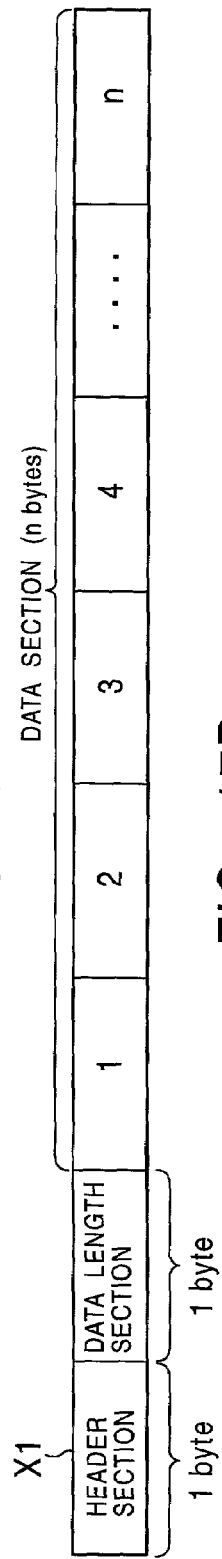
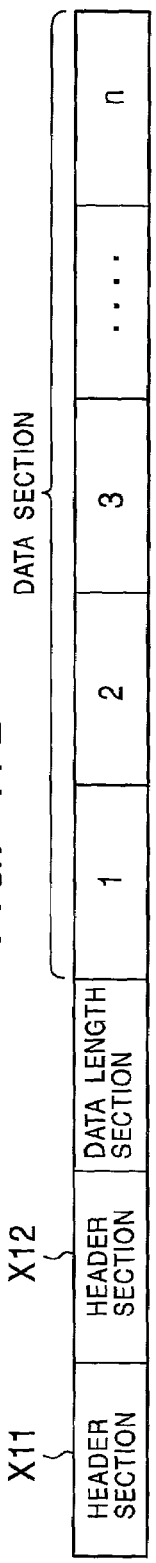
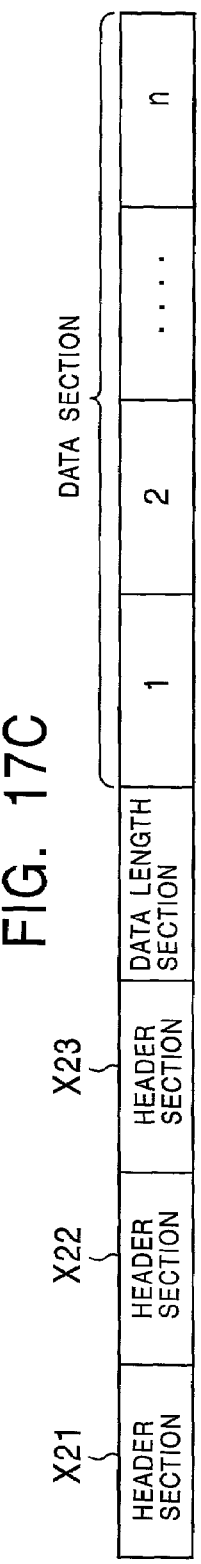
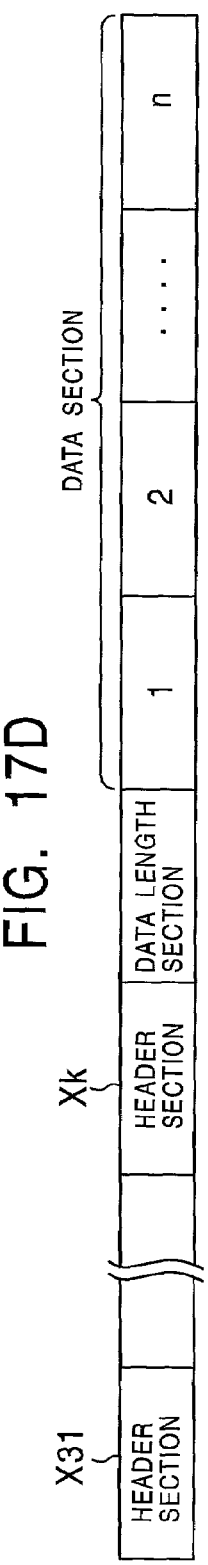

FIG. 18A

| b7 | KEY WORD EXTENSION | 0: NOT EXTENDED<br>1: EXTENDED |
|---|---|---|
| b6 | VALUE LENGTH | 0: FIXED LENGTH<br>1: VARIABLE LENGTH |
| b5-b0 | KEY WORD NO. | 0~63, DEPENDING ON VALUE LENGTH |

FIG. 18B

| b7 | KEY WORD EXTENSION | 0: NOT EXTENDED<br>1: EXTENDED |
|---|---|---|
| b6-b0 | KEY WORD NO. | 0~127, DEPENDING ON VALUE LENGTH |

FIG. 23

| ID0 | | ID1 | | ID2 |
|---|---|---|---|---|
| b7-b5 | b4-b0 | b7-b4 | b3-b0 | |
| F_type | Track pair Num (0-31) | Reserved | SB No. (0) | OverWrite Protect |
| F_type | Track pair Num (0-31) | Reserved | SB No. (1) | OverWrite Protect |
| F_type | Track pair Num (0-31) | Reserved | SB No. (2) | OverWrite Protect |
| F_type | Track pair Num (0-31) | Reserved | SB No. (3) | OverWrite Protect |
| F_type | Track pair Num (0-31) | Reserved | SB No. (4) | OverWrite Protect |
| F_type | Track pair Num (0-31) | Reserved | SB No. (5) | OverWrite Protect |
| F_type | Track pair Num (0-31) | Reserved | SB No. (6) | OverWrite Protect |
| F_type | Track pair Num (0-31) | Reserved | SB No. (7) | OverWrite Protect |
| F_type | Track pair Num (0-31) | Reserved | SB No. (8) | OverWrite Protect |
| F_type | Track pair Num (0-31) | Reserved | SB No. (9) | OverWrite Protect |

FIG 24A

| | SUBCODE DATA |
|---|---|
| 1 | ATNF (ATN + FLG) |
| 2 | TTC |
| 3 | REC DATE |
| 4 | REC TIME |
| 5 | ATNF (ATN + FLG) |
| 6 | TTC |
| 7 | REC DATE |
| 8 | REC TIME |
| 9 | ATNF (ATN + FLG) |
| 10 | TTC |

FIG 24B

| | SUBCODE DATA |
|---|---|
| 1 | ATNF (ATN + FLG) |
| 2 | TTC |
| 3 | PART No. |
| 4 | CHAPTER START |
| 5 | ATNF (ATN + FLG) |
| 6 | TTC |
| 7 | PART No. |
| 8 | CHAPTER START |
| 9 | ATNF (ATN + FLG) |
| 10 | TTC |

FIG. 25

| b7 | b6 | b5 | b4 | b3 | b2 | b1 | b0 | b7 | b6 | b5 | b4 | b3-0 | ID2 | DATA SECTION 1 PACK (5B) User Tape | DATA SECTION 1 PACK (5B) | DATA SECTION 1 PACK (5B) Pre Rec Tape |
|---|---|---|---|---|---|---|---|---|---|---|---|---|---|---|---|---|
| | | | | ID0 | | | | | ID1 | | | | | | | |
| FR | — | AP3 | | | | | | | | LSB | BF | SB No. (0) | | 1st half (0- 4 track) | 1st half (2-9 track) | (0-9 track) |
| FR | — | S | P | | | Absolute track No. (23bi) | | | | | | SB No. (1) | ID parity | Option Area | Option Area | Option Area |
| FR | — | S | P | | MSB | | | | | | | SB No. (2) | ID parity | | | |
| FR | — | S | P | | | Absolute track No. (23bi) | | | | LSB | BF | SB No. (3) | ID parity | TTC | TTC | TTC |
| FR | — | S | P | | | | | | | | | SB No. (4) | ID parity | TTC | REC DATE | PART NO. |
| FR | — | S | P | | MSB | | | | | | | SB No. (5) | ID parity | TTC | REC TIME | CHAPTER START |
| FR | — | AP3 | | | | Absolute track No. (23bi) | | | | LSB | BF | SB No. (6) | ID parity | Option Area | Option Area | Option Area |
| FR | — | S | P | | | | | | | | | SB No. (7) | ID parity | | | |
| FR | — | S | P | | MSB | | | | | | | SB No. (8) | ID parity | TTC | TTC | TTC |
| FR | — | S | P | | | Absolute track No. (23bi) | | | | LSB | BF | SB No. (9) | ID parity | TTC | REC DATE | PART NO. |
| FR | — | S | P | | | | | | | | | SB No. (10) | ID parity | TTC | REC TIME | CHAPTER START |
| FR | APT | | | | MSB | | | | | | | SB No. (11) | ID parity | | | |

FIG. 26

| bit | FLG | DESCRIPTION |
|---|---|---|
| b7 | I | Index ID |
| b6 | — | Reserved |
| b5 | P | PP ID (still/motion Picture change Point) |
| b4 | EH | Edit Header ECC block is here |
| b3 | EPO | Edit Picture Header Offset (0-15) |
| b2 | | |
| b1 | | |
| b0 | | |

FIG. 28

| DESCRIPTION | NUMBER OF BYTES | ECCTB | DATA |
|---|---|---|---|
| ECCTB Packet Header | 1 | O | 80 |
| Length | 1 | O | 74 |
| ATNF (ATN + FLG) | 4 | O | |
| upper digits of Track pair Number | 3 | O | |
| TTC | 4 | O | |
| Binary group | 4 | O | |
| date/time original | 8 | O | |
| last modify | 8 | O | |
| generation Number | 1 | O | |
| FLG (EPO + FLG) history | 10 | O | |
| EDIT HEADER MAP | 12 | — | |
|   Header Table Number | 1 | O | |
|   1st Edit Header | | | |
|     DATA - H (4bits) | 0.5 | O | |
|     Position (TRK/SB) | 0.5 | O | |
|     VBV | 2 | O | |
|   last Edit Header | | | |
|     DATA - H (4bits) | 0.5 | O | |
|     Position (TRK/SB) | 0.5 | O | |
|     VBV | 2 | O | |
|   last Header | | | |
|     DATA - H (4bits) | 0.5 | O | |
|     Position (TRK/SB) | 1.5 | O | |
|     Edit status (representing edit point) | 1 | O | |
| ECC SB MAP | 10 | — | |
|   PES-VIDEO | 1.5 | O | |
|   PES-AUDIO | 1.5 | O | |
|   SEARCH | 1 | O | |
|   AUX | 1.5 | O | |
|   TS-1H | 1.5 | O | |
|   TS-2H | 1.5 | O | |
|   NULL | 1.5 | O | |
| SEARCH DATA MODE | 1 | O | |
| video mode | 4 | O | |
| audio mode | 3 | O | |
| | | | |
| Reserved (for ECCTB) | 19 | O | |
| | | | |
| TOTAL | | 93 | | upper digits of Track pair Number (TTC Track Phase)

record subcode data in amount corresponding to 10 frames (100 tracks)

FIG. 29

AUDIO MODE

| | |
|---|---|
| AUDIO FRAME SIZE | 3bit |
| SAMPLE FREQ | 3bit |
| QUANTIZATION | 3bit |
| AUDIO CHANNEL MODE | 3bit |
| AUDIO COMP MODE | 3bit |
| AUDIO CONTROL MODE | 8bit |
| TOTAL | 23bit |

FIG. 30

VIDEO MODE

| | |
|---|---|
| VIDEO RATE | 24bit |
| VIDEO FRAME FREQ | 3bit |
| VIDEO MODE | 5bit |
| TOTAL | 23bit |

FIG. 31

| DATA-H (4bits) | |
|---|---|
| 0: no Picture | 8: RES-END |
| 1: I-Picture | 9: AUD |
| 2: B1-Picture | 10: AUX |
| 3: B2-Picture | 11: Reserved |
| 4: P-Picture | 12: Reserved |
| 5: Copy Picture | 13: Reserved |
| 6: V-END | 14: Reserved |
| 7: A-END | 15: Reserved |

FIG. 34

| DESCRIPTION | NUMBER OF BYTES | U/X | ECCTB | Sub-Code | REMARKS |
|---|---|---|---|---|---|
| ATNF (ATN + FLG) | 4 | | O | O | |
| EXTENDED Track Pair Number | 3 | | O | | UPPER DIGITS OF TRACK PAIR NUMBER |
| TTC | 4 | O | O | O | |
| Binary group | 4 | O | O | O | |
| data/time orignal | 8 | O | O | | |
| last modify | 8 | O | O | O | |
| generation Number | 1 | O | O | | |
| FLG (EPO+FLG) history | 10 | | O | | IN AMOUNT CORRESPONDING TO 10 FRAMES |
| EDIT HEADER MAP | 10 | | O | | |
| ECC SB MAP | 12 | | O | | |
| Closed caption | 10 | O | | | 4 byte/Frame |
| SEARCH DATA mode | 1 | | O | | |
| video mode | 4 | O | O | | |
| audio mode | 3 | O | O | | |
| Video Edit info | 40 | O | | | |
| Vidio Frame aux | 40 | O | | | |
| Audio Edit info | 40 | O | | | |
| Audio Frame aux | 40 | O | | | |
| UMID | 65 | O | | | |
| MESSAGE (text/compression) | 1500 | O | | | NUMBER OF VARIABLE CHARACTERS |
| Reserved (FOR VAaux) | 138 | O | | | |
| Reserved (FOR ECCTB) | 21 | | O | | |
| | | | | | |
| TOTAL | | 1,907 | 93 | 20 | |

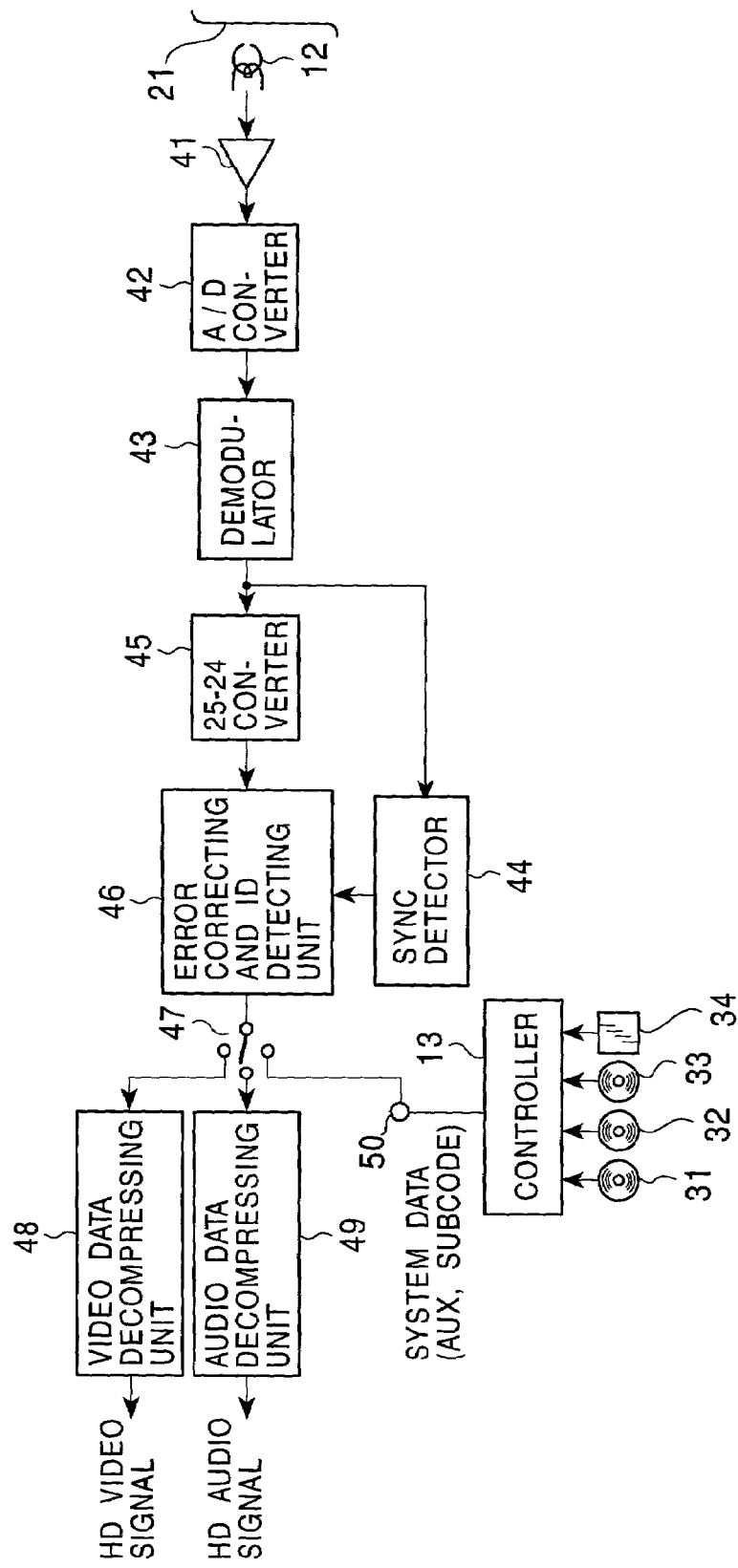

MAGNETIC TAPE RECORDING APPARATUS AND METHOD, MAGNETIC TAPE PLAYBACK APPARATUS AND METHOD, FORMAT FOR MAGNETIC TAPE, AND STORAGE MEDIUM PRODUCT

BACKGROUND OF THE INVENTION

1. Field of the Invention

The present invention relates to a magnetic tape recording apparatus and method, a magnetic tape playback apparatus and method, a format for a magnetic tape, and a storage medium product. More particularly, the present invention relates to a magnetic tape recording apparatus and method, a magnetic tape playback apparatus and method, a format for a magnetic tape, and a storage medium product, which enable high-definition video data to be recorded on or played back from the magnetic tape.

2. Description of the Related Art

Recently, with the progress of compression technology, video data, etc. have also been compressed by the DV (Digital Video) technique, for example, and recorded on a magnetic tape. A format for such compression of video data, etc. is specified as a DV format for consumer-oriented digital video cassette recorders.

FIG. 1 illustrates a construction of one track in a conventional DV format. In the DV format, video data is recorded after being subjected to the 24–25 conversion. The number of bits denoted by each numeral in FIG. 1 represents a value after being subjected to the 24–25 conversion.

A region corresponding to a contact angle of 174 degrees of a magnetic tape around a rotary magnetic head provides an effective region of one track. Outside the region of one track, an overwrite margin with a length of 1250 bits is formed. The overwrite margin serves to prevent data from remaining after being erased.

When the rotary head is rotated in sync with frequency of 60×1000/1001 Hz, the region of one track has a length of 134975 bits, and when the rotary head is rotated in sync with frequency of 60 Hz, it has a length of 134850 bits.

An ITI (Insert and Track Information) sector, an audio sector, a video sector, and a subcode sector are arranged in one track successively in the trace direction of the rotary head (i.e., in the direction from left toward right in FIG. 1). A gap G1 is formed between the ITI sector and the audio sector, a gap G2 is formed between the audio sector and the video sector, and a gap G3 is formed between the video sector and the subcode sector.

The ITI sector has a length of 3600 bits, and a preamble of 1400 bits is arranged at the head of the ITI sector to produce a clock. Subsequent to the ITI sector, an SSA (Start Sync Area) and a TIA (Track Information Area) are arranged in length of 1920 bits in this order. A bit train (sync number) necessary for detecting the position of the TIA is arranged in the SSA. Information indicating that video data is in the DV format for consumer-oriented equipment, information indicating whether the mode is an SP or LP mode, information indicating a pattern of a pilot signal of one frame, etc. are recorded in the TIA. Subsequent to the TIA, a postamble of 280 bits is arranged.

The gap G1 has a length of 625 bits.

The audio sector has a length of 11550 bits. At the head and end of the audio sector, 400 bits and 500 bits are used for a preamble and a postamble, respectively, and 10650 bits between the preamble and the postamble are used for data (audio data).

The gap G2 has a length of 700 bits.

The video sector has a length of 113225 bits. At the head and end of the video sector, 400 bits and 925 bits are used for a preamble and a postamble, respectively, and 111900 bits between the preamble and the postamble are used for data (video data).

The gap G3 has a length of 1550 bits.

The subcode sector has a length of 3725 bits when the rotary head is rotated at frequency of 60×1000/1001 Hz, and has a length of 3600 bits when the rotary head is rotated at frequency of 60 Hz. At the head and end of the subcode sector, 1200 bits are used for a preamble and 1325 bits (when the rotary head is rotated at frequency of 60×1000/1001 Hz) or 1200 bits (when the rotary head is rotated at frequency of 60 Hz) are used for a postamble, respectively, and 1200 bits between the preamble and the postamble are used for data (subcode).

In the conventional DV format, as described above, not only the gaps G1 to G3 are formed between adjacent two of the ITI sector, audio sector, video sector and the subcode sector, but also the preamble and the postamble are provided for each sector. Therefore, the conventional DV format has a drawback that it includes a relatively large amount of so-called overhead and hence cannot provide a sufficiently high level of recording rate for effective data.

Such a drawback leads to a problem as follows. When recording high-definition video data (hereinafter referred to as HD video data), for example, a bit rate of about 25 Mbps is required. However, a bit rate obtained in the conventional DV format by MP@HL in accordance with MPEG (Moving Picture Expert Group) is about 22 Mbps at maximum except for search video data. As a result, although the conventional DV format can record standard-definition video data (hereinafter referred to as SD video data), but it cannot ensure a satisfactory level of image quality when the HD video data is compressed and recorded by MP@HL or MP@H-14.

SUMMARY OF THE INVENTION

In view of the state of the art set forth above, it is an object of the present invention to enable HD video data to be recorded on and played back from a magnetic tape.

A magnetic tape recording apparatus according to the present invention comprises a first acquiring unit for acquiring video data, audio data or search data; a second acquiring unit for acquiring auxiliary data having a variable length and related to the data acquired by the first acquiring unit; a selecting unit for selecting, as first group data, one of the data acquired by the first acquiring unit and the data acquired by the second acquiring unit; a third acquiring unit for acquiring second group data containing a subcode related to the first group data; a merging unit for merging the first group data and the second group data such that the first group data and the second group data are continuously arranged on tracks of a magnetic tape without being spaced away from each other; and a supplying unit for supplying data merged by the merging unit to a rotary head to record the merged data on the magnetic tape.

The first acquiring unit may acquire, as the first group data, the video data in edit units.

Preferably, the second acquiring unit acquires, as the second group data, auxiliary data related to the audio data and auxiliary data related to the video data; and the merging unit merges the auxiliary data related to the audio data, the audio data, the auxiliary data related to the video data, and the video data to be arranged in this order.

The second acquiring unit may further acquire auxiliary data required for pre-playback; and the merging unit may merge the auxiliary data required for pre-playback to be arranged at the head of an edit unit of the video data.

Preferably, the auxiliary data required for pre-playback includes the contents recorded in a subcode sector.

A magnetic tape recording method according to the present invention comprises a first acquiring step of acquiring video data, audio data or search data; a second acquiring step of acquiring auxiliary data having a variable length and related to the data acquired by processing in the first acquiring step; a selecting step of selecting, as first group data, one of the data acquired by processing in the first acquiring step and the data acquired by processing in the second acquiring step; a third acquiring step of acquiring second group data containing a subcode related to the first group data; a merging step of merging the first group data and the second group data such that the first group data and the second group data are continuously arranged on tracks of a magnetic tape without being spaced away from each other; and a supplying step of supplying data merged by processing in the merging step to a rotary head to record the merged data on the magnetic tape.

A storage medium product according to the present invention stores a computer-readable program comprising a first acquiring step of acquiring video data, audio data or search data; a second acquiring step of acquiring auxiliary data having a variable length and related to the data acquired by processing in the first acquiring step; a selecting step of selecting, as first group data, one of the data acquired by processing in the first acquiring step and the data acquired by processing in the second acquiring step; a third acquiring step of acquiring second group data containing a subcode related to the first group data; a merging step of merging the first group data and the second group data such that the first group data and the second group data are continuously arranged on tracks of a magnetic tape without being spaced away from each other; and a supplying step of supplying data merged by processing in the merging step to a rotary head to record the merged data on the magnetic tape.

In a format for a magnetic tape according to the present invention, first group data comprising video data, audio data or search data, or comprising auxiliary data having a variable length and related to the video data, the audio data or the search data, and second group data containing a subcode related to the video data, the audio data or the search data are recorded such that the first group data and the second group data are continuously arranged on tracks of the magnetic tape without being spaced away from each other.

With the magnetic tape recording apparatus, the magnetic tape recording method, and the storage medium product storing the computer-readable program according to the present invention, video data, audio data or search data is acquired, and auxiliary data having a variable length and related to the acquired data is acquired. One of these two types of acquired data is selected as first group data, and second group data containing a subcode related to the first group data is acquired. The first group data and the second group data are merged such that the first group data and the second group data are continuously arranged on tracks of a magnetic tape without being spaced away from each other. Merged data is recorded on the magnetic tape.

A magnetic tape playback apparatus according to the present invention comprises an acquiring unit for acquiring auxiliary data, as first group data, having a variable length and related to compressed high-definition or standard-definition video data, audio data or search data, or second group data containing a subcode related to the first group data; and a decompressing unit for decompressing the compressed high-definition video data, which is contained in data reproduced from a magnetic tape with a rotary head, by using the auxiliary data or the second group data acquired by the acquiring unit.

A magnetic tape playback method according to the present invention comprises an acquiring step of acquiring auxiliary data, as first group data, having a variable length and related to compressed high-definition or standard-definition video data, audio data or search data, or second group data containing a subcode related to the first group data; and a decompressing step of decompressing the compressed high-definition video data, which is contained in the data reproduced from a magnetic tape with a rotary head, by using the auxiliary data or the second group data acquired by processing in the acquiring step.

A storage medium product according to the present invention stores a computer-readable program comprising an acquiring step of acquiring auxiliary data, as first group data, having a variable length and related to compressed high-definition or standard-definition video data, audio data or search data, or second group data containing a subcode related to the first group data; and a decompressing step of decompressing the compressed high-definition video data, which is contained in data reproduced from a magnetic tape with a rotary head, by using the auxiliary data or the second group data acquired by processing in the acquiring step.

With the magnetic tape playback apparatus, the magnetic tape playback method, and the storage medium product storing the computer-readable program according to the present invention, auxiliary data, as first group data, having a variable length and related to compressed high-definition or standard-definition video data, audio data or search data, or second group data containing a subcode related to the first group data is acquired. The compressed high-definition video data, which is contained in data reproduced from a magnetic tape with a rotary head, is decompressed by using the acquired auxiliary data or second group data.

BRIEF DESCRIPTION OF THE DRAWINGS

FIG. 11 is a representation for explaining an SB header of the main sector shown in FIG. 9;

FIG. 12 shows data representing a search data;

FIG. 13 shows data representing types of AUX data;

FIG. 14 is a table for explaining system data having a fixed length;

FIG. 15 is a table for explaining system data having a variable length;

FIGS. 16A, 16B, 16C and 16D are representations for explaining formats of system data having a fixed length;

FIGS. 17A, 17B, 17C and 17D are representations for explaining formats of system data having a variable length;

FIGS. 18A and 18B are tables for explaining information defined in a header section;

FIG. 23 is a table for explaining a subcode sync block ID;

FIGS. 24A and 24B are representations for explaining subcode data;

FIG. 25 is another representation for explaining the conventional DV format;

FIG. 26 is a table for explaining tape position information;

FIG. 28 is a table for explaining an ECCTB;

FIG. 29 shows data for an audio mode;

FIG. 30 shows data for a video mode;

FIG. 31 is a table for explaining DATA-H;

FIG. 34 is a table for explaining the AUX data;

FIG. 36 is a block diagram showing one example of construction of a playback system of the magnetic tape recording/playback apparatus according to the present invention.

DESCRIPTION OF THE PREFERRED EMBODIMENTS

Figure 1:
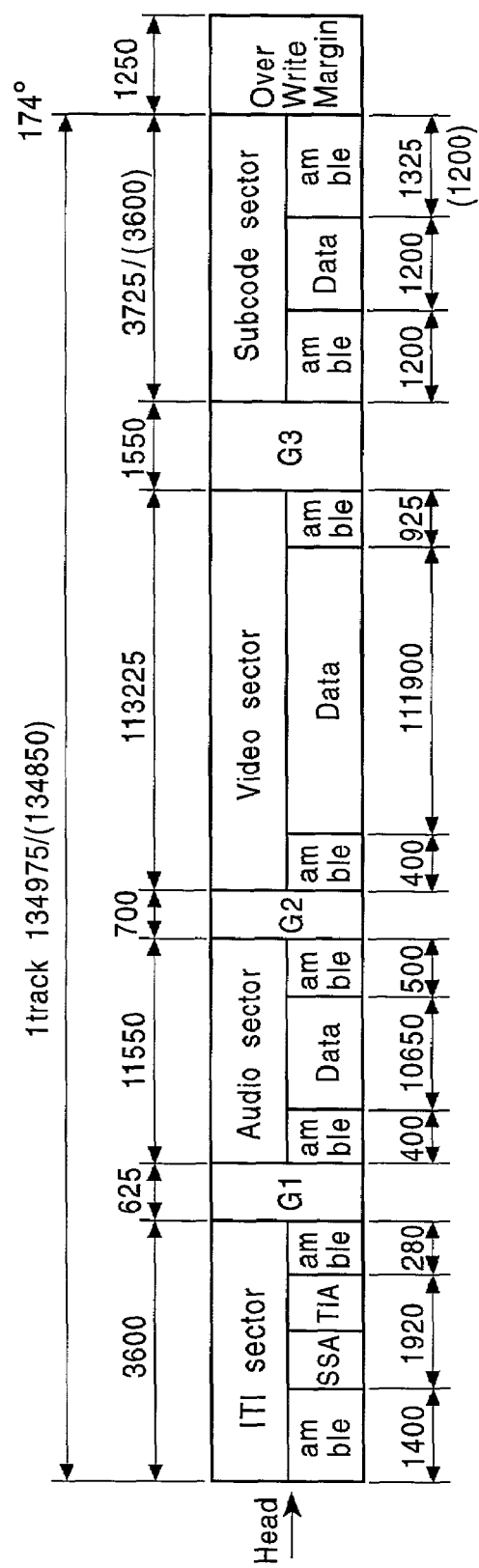
FIG. 1 is a representation for explaining an arrangement of track sectors in a conventional DV format.
Figure 2:
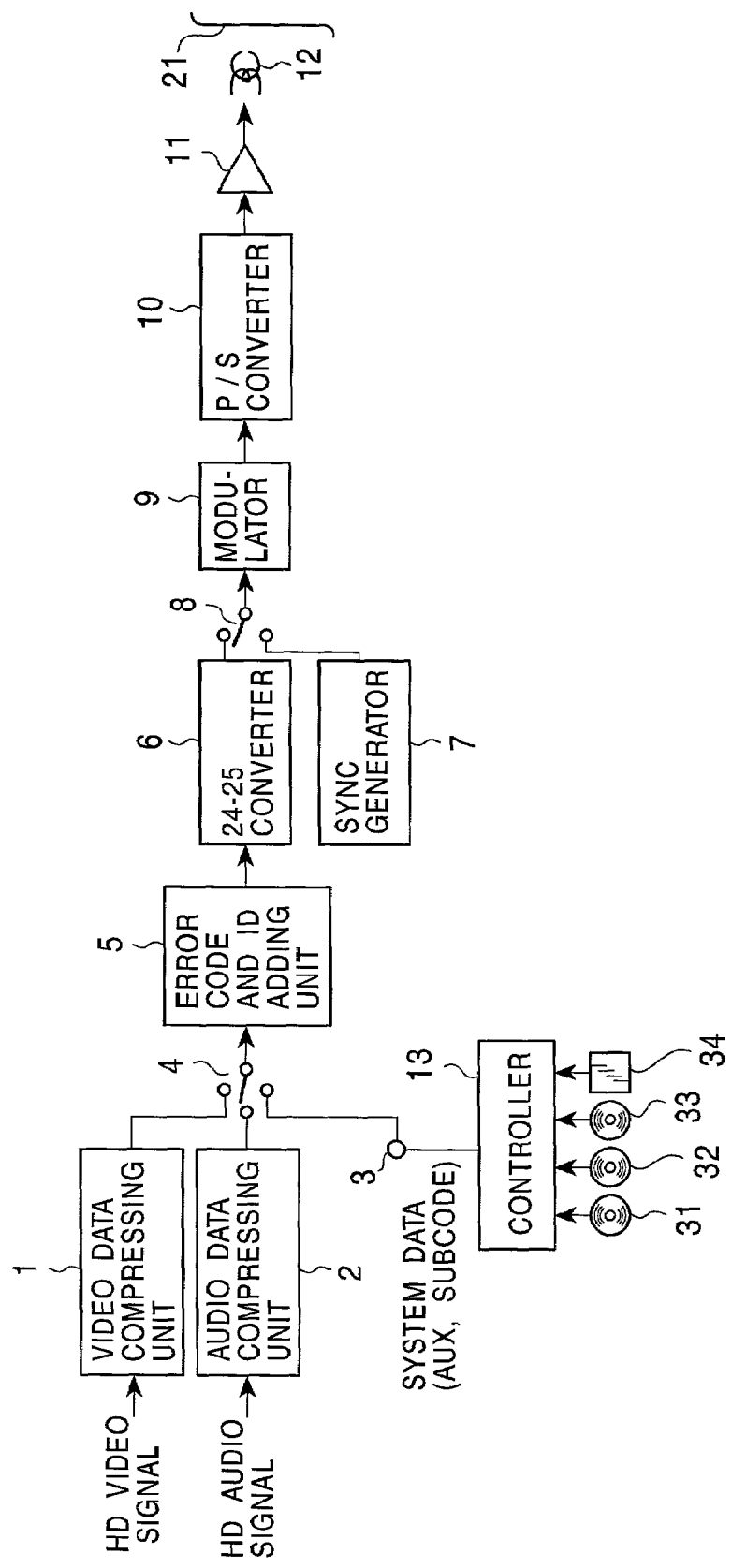
FIG. 2 is a block diagram showing one example of construction of a recording system of a magnetic tape recording/playback apparatus according to the present invention.

FIG. 2 shows one example of construction of a recording system of a magnetic tape recording/playback apparatus to which the present invention is applied. A video data compressing unit 1 compresses an inputted HD video signal by, e.g., MP@HL or MP@H-14 in accordance with MPEG.

An audio data compressing unit 2 compresses an audio signal, which corresponds to the HD video signal, by an audio compression method in accordance with MPEG1 layer2 or AAC, for example. The audio signal is compressed to a rate of 256 Kbps to 384 Kbps by the audio data compressing unit 2.

System data made up of AUX (auxiliary) data, subcode data, etc. is inputted to a terminal 3 from a controller 13. The system data contains data representing text information externally inputted as additional data, associated with the video and audio signals, to indicate the copyright, shooting situation, etc., a title time code (TTC) for assisting a search, editing, etc., track position information, apparatus setting information, and so on.

A switch 4 is changed over by the controller 13 to select an output of the video data compressing unit 1, an output of the audio data compressing unit 2, or the system data supplied through the terminal 3 at the predetermined timing for supply to an error code and ID adding unit 5.

The error code and ID adding unit 5 adds an error detecting/correcting code and an ID to the data inputted through the switch 4, and carries out an interleaving process among 16 tracks. Resulting data is outputted to a 24–25 converter 6.

The 24–25 converter 6 adds redundant one bit, which is selected to enhance components of a pilot signal for tracking so as to appear at a higher level, for converting the inputted data in units of 24 bits into data in units of 25 bits.

A sync generator 7 generates sync data and amble data that are added to main data (FIG. 9) and subcode data (FIG. 22) described later.

A switch 8 is controlled by the controller 13 to select one of an output of the 24–25 converter 6 and an output of the sync generator 7 for outputting to a modulator 9.

The modulator 9 modulates the data inputted through the switch 8 by a method (which is the same as that used for the conventional DV format) suitable for recording on a magnetic tape 21, and supplies modulated data to a parallel/serial (P/S) converter 10.

The parallel/serial converter 10 converts the inputted parallel data into serial data.

An amplifier 11 amplifies the data inputted from the parallel/serial converter 10 and supplies amplified data to a rotary head 12, which is attached to and rotated by a rotary drum (not shown), for recording of the data on the magnetic tape 21.

Figure 3:
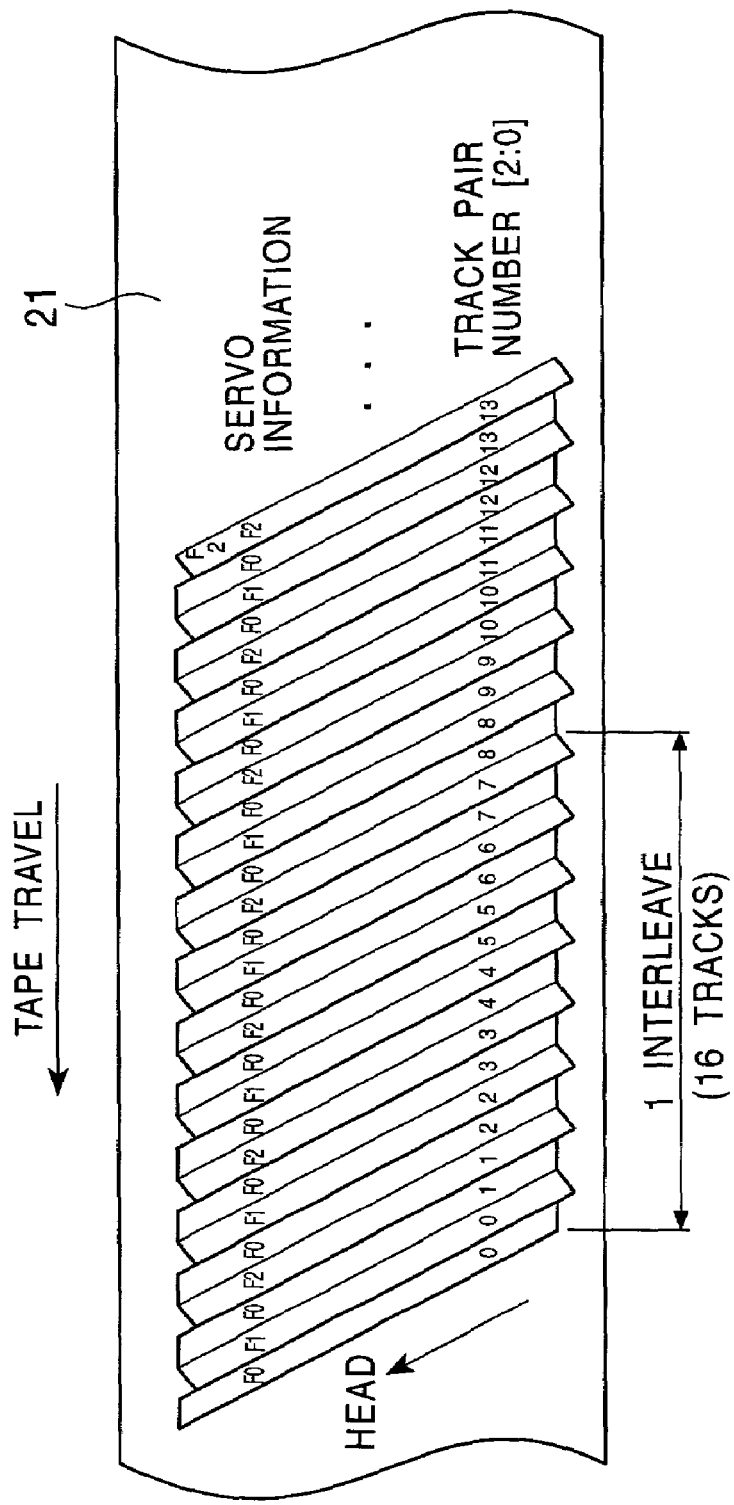
FIG. 3 is a representation for explaining a format of tracks formed on a magnetic tape shown in FIG. 2.

FIG. 3 represents a format of tracks formed on the magnetic tape 21 by the rotary head 12. The rotary head 12 traces the magnetic tape 21 in the direction from lower right toward upper left as viewed in the drawing, whereby tracks inclined relative to the lengthwise direction of the magnetic tape 21 are formed. The magnetic tape 21 travels in the direction from right toward left as viewed in the drawing.

Each track is formed as one of F0, F1 and F2 depending on the type of pilot signal for tracking control, which is recorded in the track. The tracks are formed in the order of F0, F1, F0, F2, F0, F1, F0 and F2.

Figure 4:
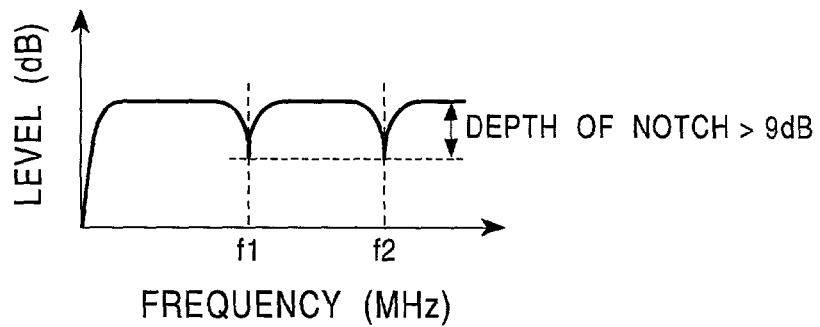
FIG. 4 is a chart for explaining a pilot signal for tracking control recorded in one track shown in FIG. 3.
Figure 5:
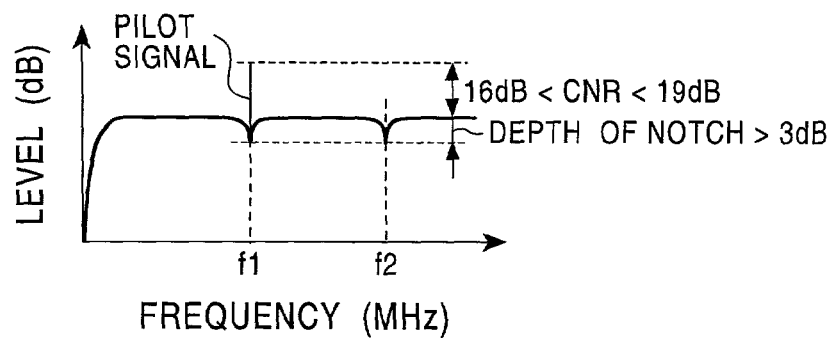
FIG. 5 is a chart for explaining another pilot signal for tracking control recorded in another track shown in FIG. 3.
Figure 6:
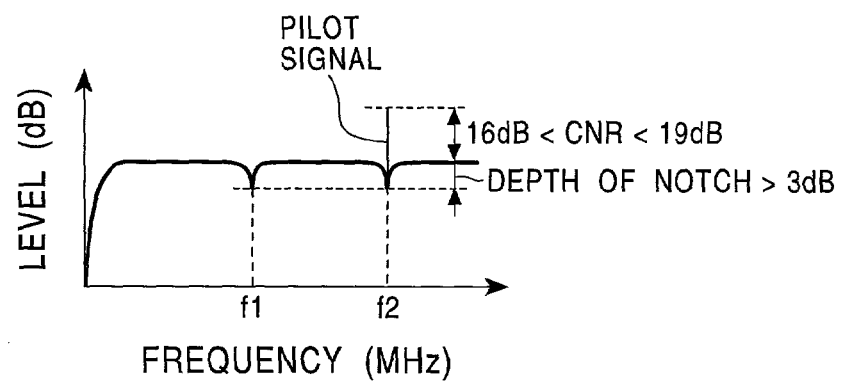
FIG. 6 is a chart for explaining still another pilot signal recorded in still another track shown in FIG. 3.

The track F0 records therein, as shown in FIG. 4, no pilot signals of frequency f1 and f2. The track F1 records therein, as shown in FIG. 5, the pilot signal of frequency f1. The track F2 records therein, as shown in FIG. 6, the pilot signal of frequency f2.

The frequencies f1, f2 are set respectively to values that are 1/90 and 1/60 of the recording frequency of channel bits.

As shown in FIG. 4, the depth of notches at the frequencies f1, f2 in the track F0 is set to 9 dB. On the other hand, as shown in FIG. 5 or FIG. 6, the CNR (Carrier to Noise Ratio) of the pilot signal of frequency f1 or f2 is set to a value larger than 16 dB but smaller than 19 dB. Further, the depth of notches at the frequencies f1, f2 in the track F1 or F2 is set to a value larger than 3 dB.

A track pattern having such frequency characteristics is similar to that in the case of using the conventional DV format. A recording rate is about 40 Mbps, i.e., 300 tracks per second. Accordingly, a magnetic tape, a rotary head, a driving system, a demodulation system, and a control system of a consumer-oriented digital video cassette recorder can be used, as they are, in this embodiment.

Track pair numbers are set to tracks. Each track pair number is assigned for each track pair, i.e., two tracks which are scanned at a time by two heads having a positive azimuth and a negative azimuth. Track pair numbers from 0 to 31 are assigned in an example of FIG. 3. The track pair number 0, 8, 16 or 24 is set to the track pair at the head of every 16 tracks which undergoes interleaving (although the track pairs to be assigned with the numbers 16 and 24 are not shown).

Figures 7, 8:
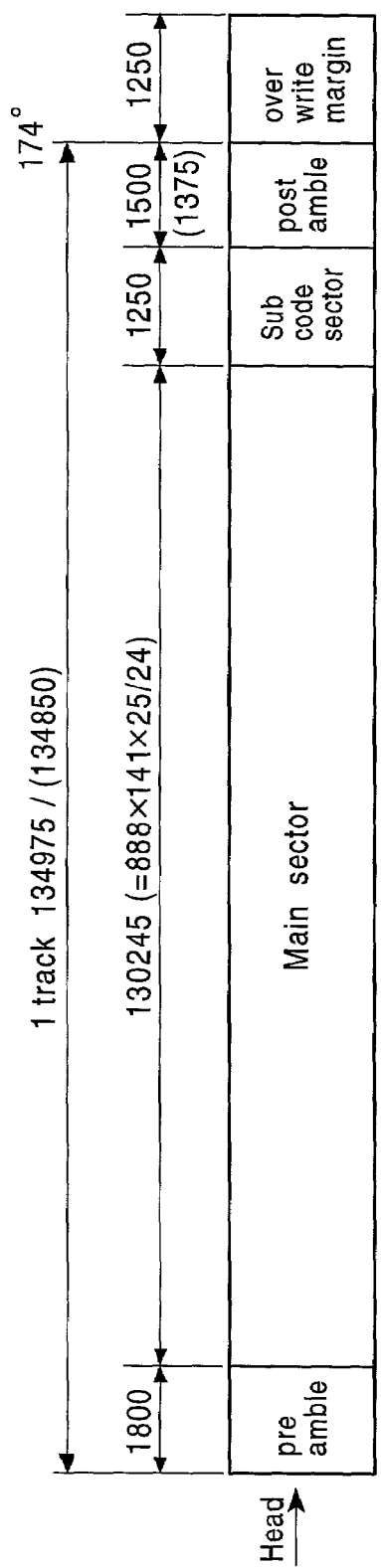
FIG. 7 is a representation for explaining a sector arrangement within each track shown in FIG. 3.
FIG. 8 is a representation for explaining patterns of a preamble and a postamble shown in FIG. 7.

FIG. 7 shows one example of a sector format (sector arrangement) within each track. In FIG. 7, the number of bits indicating the length of each sector or section is represented by the length after being subjected to the 24–25 conversion. One track has a length of 134975 bits when the rotary head 12 is rotated at frequency of 60×1000/1001 Hz, and has a length of 134850 bits when it is rotated at frequency of 60 Hz. The length of one track corresponds to a contact angle of 174 degrees of the magnetic tape 21 around the rotary head 12. Subsequent to one track, an overwrite margin of 1250 bits is formed. The overwrite margin serves to prevent data from remaining after being erased.

In FIG. 7, the rotary head 12 traces the track in the direction from left toward right. A preamble of 1800 bits is arranged at the head of the track. Data in combination of a pattern A and a pattern B shown in FIG. 8, by way of example, which are required to produce a clock, is recorded in the preamble. In the pattern A and the pattern B, values 0 and 1 are reversed between them. By properly combining those patterns, a tracking pattern for each of the tracks F0, F1 and F2, shown in FIGS. 4 to 6, can be obtained. Note that run patterns in FIG. 8 represent patterns resulted after the 24–25 conversion executed by the 24–25 converter 6 in FIG. 2.

Figure 9:
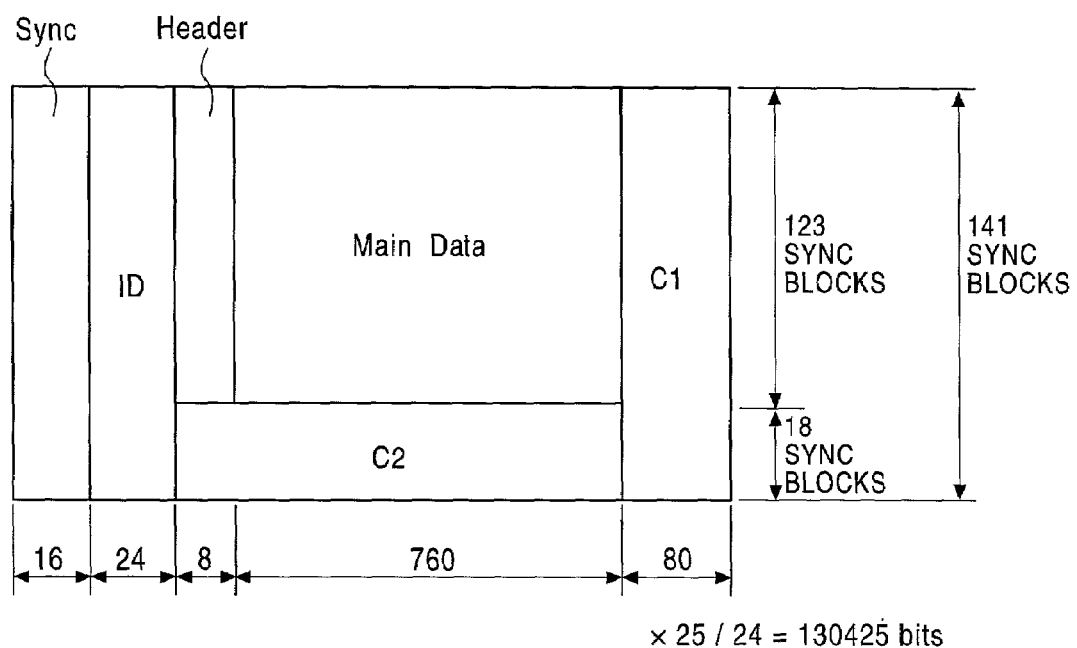
FIG. 9 is a representation for explaining a structure of a main sector shown in FIG. 7.

Subsequent to the preamble of 1800 bits, a main sector with a length of 130425 bits is arranged. FIG. 9 shows a structure of the main sector. The main sector is subjected to normal playback and search playback.

As shown in FIG. 9, the main sector is made up of 141 sync blocks each having a length of 888 bits (111 bytes).

Of 141 sync blocks, 123 sync blocks each comprise a 16-bit sync, 24-bit ID, 8-bit sync block (SB) header, 760-bit main data, and an 80-bit parity C1.

The sync is generated by the sync generator 7.

Figure 10A:
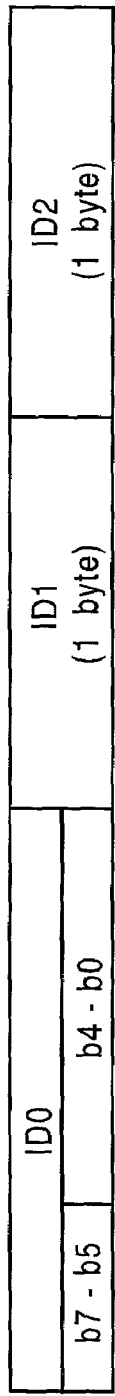
FIGS. 10A and 10B are representations for explaining a main sector ID shown in FIG. 9.

The ID is made up of, as shown in FIG. 10A, three IDs, i.e., ID0 to ID2, each having a length of 1 byte.

Of b7-b0 of ID0, b7-b5 define the format type of the track, and b4-b0 define the track pair number.

In addition to the type shown in FIG. 7, the track format may be of, for example, the type wherein another ITI sector is further provided and the main sector is made up of 139 sync blocks, or the type wherein another ITI sector and an after-recording sector comprising 7 sync blocks are further provided and the main sector is made up of 129 sync blocks. Stated otherwise, an ID or the like for identifying the type of usable format is allocated to b7-b5 of ID0. By thus arranging the ID to identify the type of track format, it is possible to execute a demodulation process adapted for the type of each format, and to reproduce data in an appropriate manner.

The sync block number is allocated to ID1.

Information indicating whether the data recorded in the main sector is newly recorded one (i.e., data recorded for the first time in a vacant state) or overwritten one (i.e., data recorded on previously recorded data) is allocated to ID2 as one byte of overwrite protect. In the case of overwriting, for example, if underlying data remains due to, e.g., instantaneous clogging of the head, newly recorded data is corrected (erroneously corrected) based on the parity C1. To prevent such erroneous correction, the newly recorded data and the overwritten data are distinguished with the byte of overwrite protect. If the underlying data is determined as being remained, it is possible to make all of the relevant sync blocks invalid (handle them as a burst error) and carry out erasure correction based on a parity C2.

Figure 10B:
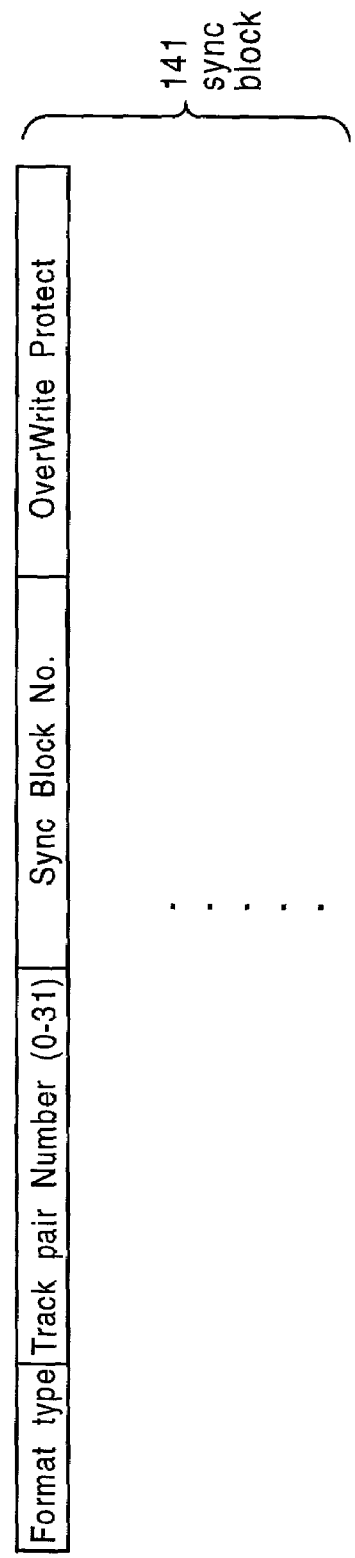

Fig. 10B shows ID0 to ID2 contained in each of the 141 sync blocks. ID0 to ID2 are added by the error code and ID adding unit 5.

As shown in FIG. 11, the SB header comprises 8 bits of b7-b0. Of b7-b0, b7-b5 set a predetermined value indicating the type of main data (such as audio data, video data, search video data, transport stream data, and AUX data), and b4-b0 set a predetermined value indicating details of the main data.

A value 0 of b7-b5 indicates that the main data is video data (PES video data) in a PES (Program Elementary Stream) format in accordance with MPEG2. A value 1 of b7-b5 indicates that the main data is audio data (PES audio data) in the PES format. In this case, data indicating whether the data (video or audio data) is partial (less than 95 bytes) or full (95 bytes) is allocated to b4 of b4-b0, and data indicating a counted value is allocated to b3-b0.

A value 2 of b7-b5 indicates that the main data is search data. In this case, data indicating whether the search data is video or audio data is allocated to b4 of b4-b0, and data indicating a search speed is allocated to b3-b1. As shown in FIG. 12, by way of example, a value 1 of b3-b1 indicates a 4-time speed; a value 2 indicates an 8-time speed; a value 4 indicates a 16-time speed; and a value 5 indicates a 32-time speed. Additionally, by designing the rotary head (drum) to rotate at a speed in a following manner, a search can be performed with a wider range of adaptable speed for each multiple speed (corresponding to the drum rotational speed). Furthermore, the search video data is a low-bit rate data resulting from omitting high-frequency components of an I picture.

Returning to FIG. 11, a value 3 of b7-b5 indicates that the main data is AUX (auxiliary) data. In this case, data indicating the type (AUX mode) of AUX data is allocated to b4-b2 of b4-b0, by way of example, as shown in FIG. 13.

More specifically, a value 1 of b4-b2 indicates that the AUX data is related to the PES video data (AUX-V in FIG. 11), and a value 1 indicates that the AUX data is related to the PES audio data (AUX-A). A value 2 indicates that the AUX data is PSI (Program Specification Information) (PES-PSI1) corresponding to the first half of the data recorded in a transport stream format, and a value 3 indicates that the AUX data is PSI (PES-PSI2) corresponding to the second half of those recorded data. A value 4 indicates that the AUX data is any of predetermined data (called system data; System), shown in FIGS. 14 and 15, for each of which a keyword number is set. Though described later in more detail, FIG. 14 represents the system data fixed in data amount and FIG. 15 represents the system data variable in data amount.

Returning to FIG. 11 again, a value 4 of b7-b5 indicates that the main data corresponds to the first half of the data recorded in the transport stream format. In this case, a jump flag is allocated to b4 and b3, and a time stamp is allocated to b2-b0. A value 5 of b7-b5 indicates that the main data corresponds to the second half of the data recorded in the transport stream format. In this case, a counted value is allocated to b4-b0.

A value 6 of b7-b5 indicates that no data is recorded as the main data, i.e., it represents NULL. NULL is inserted when an average total amount of main data is less than the recording-enable rate. For example, if the rate is 20 Mbps when recorded in the transport stream format, NULL is inserted in amount of about 5 Mbps.

The above-described data of the SB header is supplied from the controller 13 through the terminal 3.

The main data recorded in the main sector is the video data supplied from the video data compressing unit 1, or the audio data supplied from the audio data compressing unit 2, and the AUX data (system data) supplied from the controller 13 through the terminal 3.

A packet structure of the system data (i.e., the AUX data recorded as the main data in the main sector with a value 3 being set to b7-b5 of the SB header and a value 0 (AUX-V), a value 1 (AUX-A) or a value 4 (System) being set to b4-b2, as well as in a data section of a subcode sector) will now be described.

When the system data has a fixed length as shown in FIG. 14, it comprises a header section (keyword of 1 byte) including the keyword number, etc., and a data section (with a fixed length (4 bytes)) for storing the system data corresponding to the keyword number, as shown in FIG. 16A. Also, when the system data has a variable length as shown in FIG. 15, it comprises a header section (keyword of 1 byte), a data length section (1 byte) indicating the data length, and a data section (with a variable length (n bytes)), as shown in FIG. 17A.

Further, in this embodiment, plural sets of system data may be recorded in the main sector. In such a case, a plurality of head sections are provided as shown in FIGS. 16B to 16D when the length of the system data is fixed, and they are provided as shown in FIGS. 17B to 17D when the length of the system data is variable.

Of 1 byte of each header section (8 bits of b7-b0), b7 sets therein data indicating whether another subsequent header section follows to the relevant one. More specifically, a value 0 is set in b7 of each header section, following which no header section is arranged, such as a header section F1 (FIG. 16A), header section F12 (FIG. 16B), header section F23 (FIG. 16C) and a header section Fk (FIG. 16D) shown in examples of FIG. 16, or a header section X1 (FIG. 17A), header section X12 (FIG. 17B), header section X23 (FIG. 17C) and a header section Xk (FIG. 17D) shown in examples of FIG. 17.

On the other hand, a value 1 is set in b7 of each header section, following which another header section is arranged, such as a header section F11, header sections F12, F22 and header sections F31, etc. (except for the header section Fk) shown in the examples of FIG. 16, or a header section X11, header sections X21, X22 and header sections X31, etc. (except for the header section Xk) shown in the examples of FIG. 17.

Further, data allocated to b6-b0 of b7-b0 of each header section differ between the header section arranged at the head (such as the header sections F1, F11, F21 and F31 shown in the examples of FIG. 16, or the header sections X1, X11, X21 and X31 shown in the examples of FIG. 17) and the other header sections arranged in second and subsequent positions (such as the header sections F12, F22, F23 and F32-Fk shown in the examples of FIG. 16, or the header sections X12, X22, X23 and X32-Xk shown in the examples of FIG. 17).

Of b6-b0 of each header section arranged at the head, b6 sets therein data indicating whether the length of the system data is fixed or variable. More specifically, a value 0 indicating the length of the system data being fixed is set in b6 of the header section F1, header section F11, header section F21 and the header section F31 shown in the examples of FIG. 16, and a value 1 indicating the length of the system data being variable is set in b6 of the header section X1, header section X11, header section X21 and the header section X31 shown in the examples of FIG. 17.

In the remaining b5-b0 of each header section arranged at the head, any of the keyword numbers (0 to 63) shown in FIG. 14, i.e., one keyword number of the system data having a fixed length, is set.

On the other hand, in b6-b0 of each of the header sections arranged at the second and subsequent positions, any of the keyword numbers (64 to 127) shown in FIG. 15, i.e., one keyword number of the system data having a variable length, is set.

FIG. 18 shows collectively the above-described data allocated in the header section arranged at the head (FIG. 18A) and the header sections arranged at the second and subsequent positions (FIG. 18B).

Figure 19:
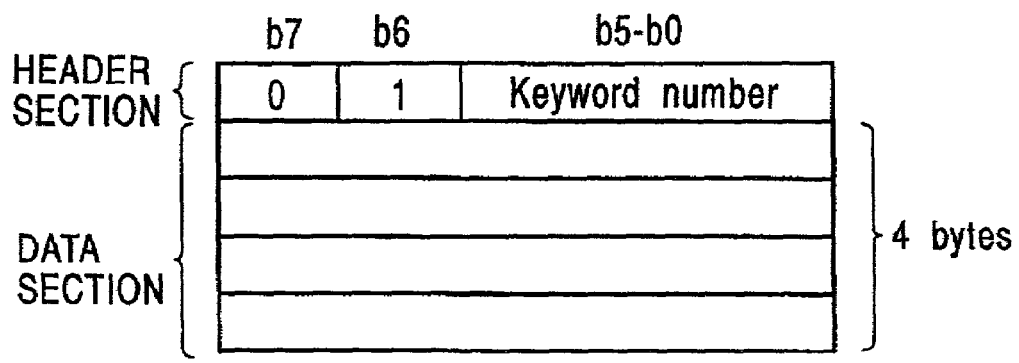
FIG. 19 is another representation for explaining the format of the system data having a fixed length.
Figure 20:
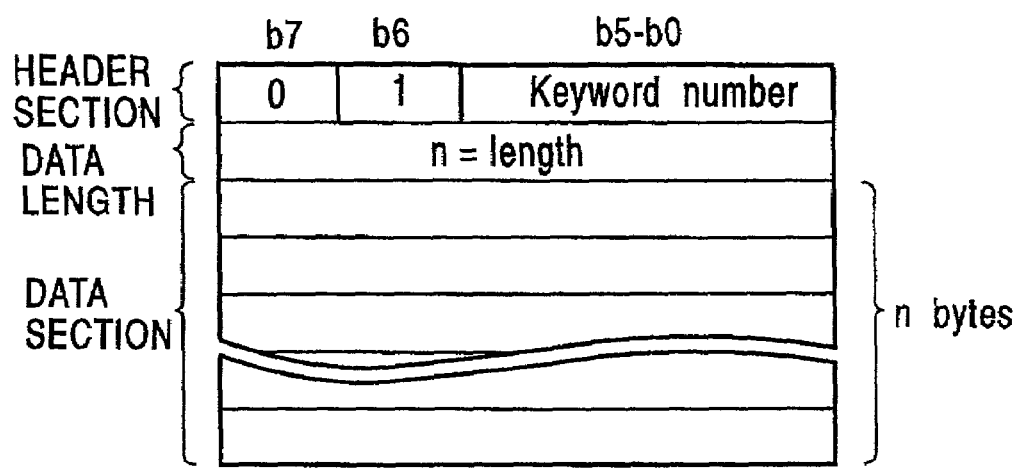
FIG. 20 is another representation for explaining the format of the system data having a variable length.

FIGS. 19 and 20 represent, in the bit-array form, the system data having a fixed length (FIGS. 14 and 16) and the system data having a variable length (FIGS. 15 and 17), respectively.

Note that the above-described system data is also recorded as subcode data in the subcode sector described later.

The parity C1 (FIG. 9) is calculated by the error code and ID adding unit 5 from the ID, SB header and the main data for each sync block, and then added.

Of 141 sync blocks, 18 sync blocks are used for the sync, ID, parity C2, and the parity C1. The parity C2 is obtained by calculating the SB header or the main data in the vertical direction in FIG. 9. This calculation is executed in the error code and ID adding unit 5. By so selecting 18 sync blocks, a percentage of the number of sync blocks of the parity C2 with respect to the total number (141) of sync blocks is given by 12.7% (=18/141). This value is larger than the percentage (12.5% (=2 tracks/16 tracks)) that is required to develop the ability for correcting a continuous error over two or more tracks.

Figure 21:
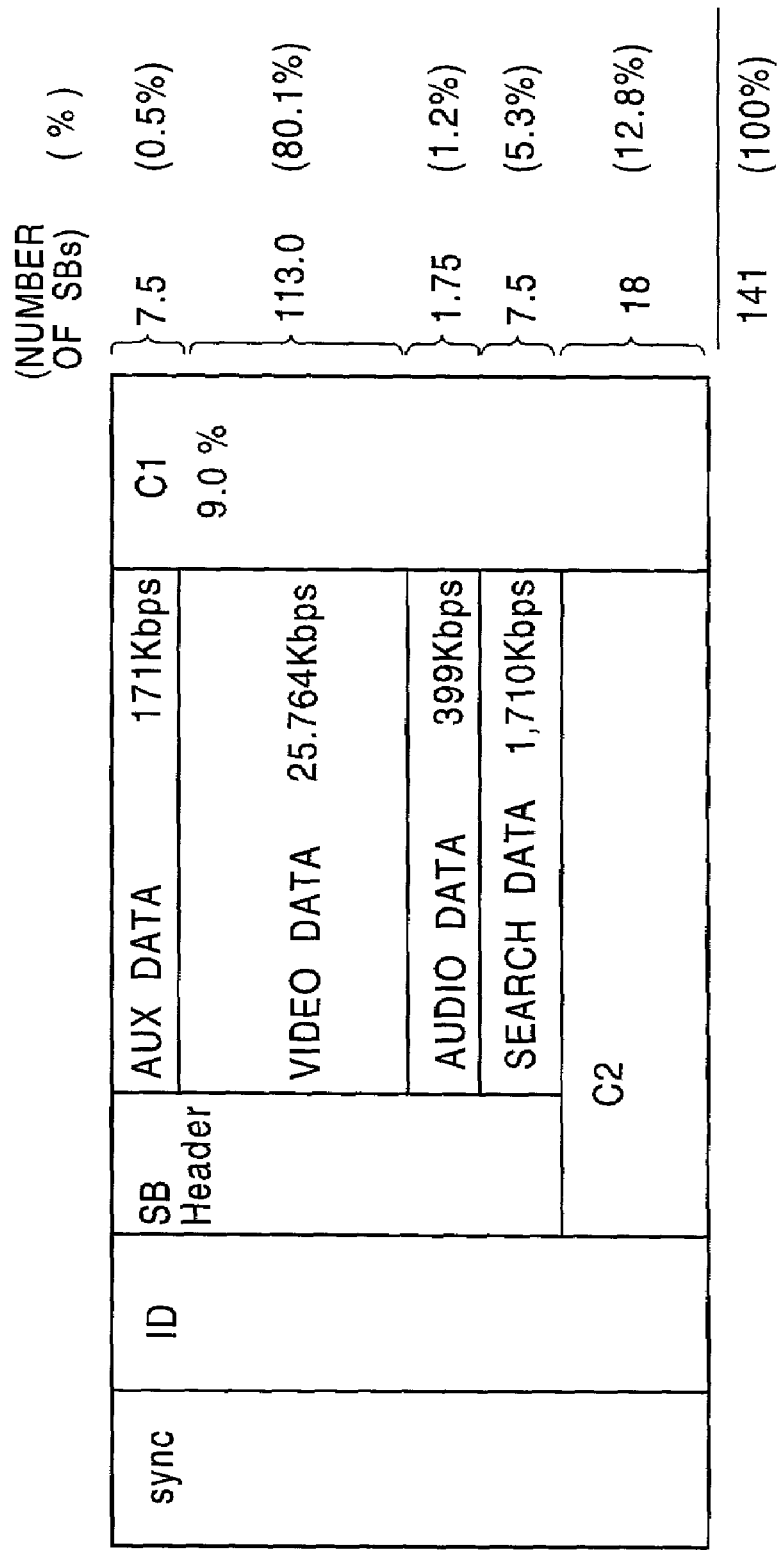
FIG. 21 is a representation for explaining average values of data recorded in the main sector.

FIG. 21 shows average values of the AUX data, video data, audio data, search data, parity C1, and the parity C2 recorded as the main data before the 24–25 conversion.

More specifically, the average values of the numbers of sync blocks constituting the AUX data, video data, audio data, and the search data are respectively 7.5, 113, 1.75 and 7.5. Thus, bit rates of these data in average are given as follows:

$$AUX \text{ data} = 95 \text{ bytes} \times 0.75 \ SB \times 300 \text{ tracks} \times 8 \text{ bits}$$
$$= 171 \text{ kbps}$$
$$\text{video data} = 95 \text{ bytes} \times 113 \ SB \times 300 \text{ tracks} \times 8 \text{ bits}$$
$$= 25.764 \text{ Mbps}$$
$$\text{audio data} = 95 \text{ bytes} \times 1.75 \ SB \times 300 \text{ tracks} \times 8 \text{ bits}$$
$$= 339 \text{ kbps}$$
$$\text{search data} = 95 \text{ bytes} \times 7.5 \ SB \times 300 \text{ tracks} \times 8 \text{ bits}$$
$$= 1710 \text{ kbps}$$

Eventually, a total bit rate is given by 28.044 (=171 kbps+25.764 Mbps+339 kbps+1710 kbps) Mbps, and this rate is sufficient to record the HD video data, audio compressed data, AUX data, and the search video data by MP@HL or MP@H-14. Note that 95 bytes mean the data amount of the SB header and the main data in one sync block.

Figure 22:
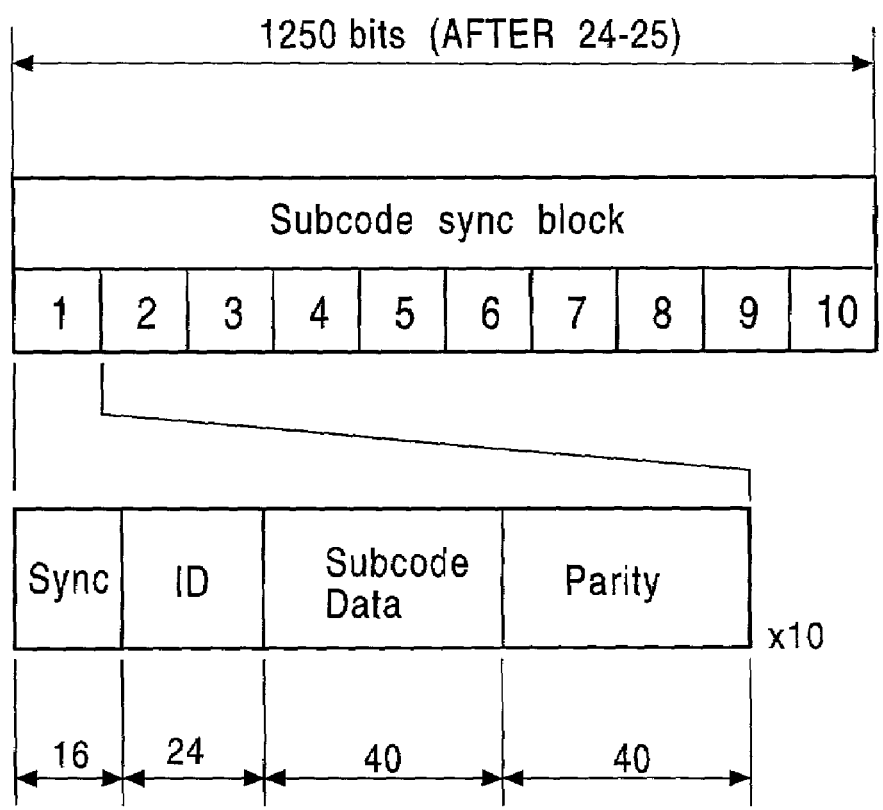
FIG. 22 is a representation for explaining a structure of a subcode sector shown in FIG. 7.

Subsequent to the main sector, a subcode sector (FIG. 7) of 1250 bits is arranged. FIG. 22 shows a structure of the subcode sector.

The subcode sector in one track has a length of 1250 bits (in terms of a value after the 24–25 conversion) and comprises 10 subcode sync blocks.

One subcode sync block is made up of a sync of 16 bits, ID of 24 bits, subcode data of 40 bits, and a parity of 40 bits. Thus, the length of one subcode sync block is 120 bits (in terms of a value before the 24–25 conversion), which is about ⅐ of the length (888 bits) of one sync block of the main sector described above. By setting the data length of the subcode sync block to be so short, the contents of the subcode sync blocks can be surely read even with high-speed playback on the order of 200-time speed, and therefore a high-speed search can be performed.

The sync in the subcode sector differs from the sync added to the main sector so that the main sector and the subcode sector may be distinguished based on such a difference in the sync. The sync in the subcode sector is added by the sync generator 7 in FIG. 2.

The sync block ID is made up of, as shown in FIG. 23A, three IDs, i.e., ID0 to ID2, each having a length of 1 byte.

As with ID0 in the main sector of FIG. 10A, ID0 defines the format type and the track pair number.

Of b7-b0 of ID1, b3-b0 define the subcode sync block number, and b7-b4 are reserved bits.

The sync block number is one of numbers 0–9 that are assigned respectively to 10 subcode sync blocks contained in the subcode sector of one track.

As with ID2 in the main sector, one byte of overwrite protect is allocated to ID2. In the subcode sector, if ID2 indicates that the recorded data is underlying one, the processing is executed after making all of the sync blocks invalid (i.e., on a judgment that all of the sync blocks have not been acquired).

FIG. 23B shows ID0–ID2 contained in the 10 subcode sync blocks. These ID0–ID2 are added by the error code and ID adding unit 5.

The subcode data arranged subsequent to the subcode sync block ID is the system data having a fixed length shown in FIG. 14. In other words, the subcode data is recorded in the form as shown in FIGS. 16 and 19. Further, the type of subcode data differs between a user tape and the so-called Pre-REC tape. In the case of a user tape, as shown in FIG. 24A, the tape position information (ATNF), title time code (TTC), recording date, and the recording time are recorded as the subcode data. In the case of a Pre-REC tape, as shown in FIG. 24B, the tape position information (ATNF), title time code (TTC), part number, and the chapter start position are recorded as the subcode data. Stated otherwise, in a Pre-REC tape, the part number and the chapter start position are included in the subcode data respectively in place of the recording date and the recording time in a user tape.

The subcode data is supplied from the controller 13 through the terminal 3 shown in FIG. 2.

FIG. 25 shows a data structure of the subcode sync ID and the subcode data in the conventional DV format. As seen from FIG. 25, the conventional DV format is not able to record the data position information (EPO in ATNF), etc. that are recorded in the present invention.

Returning to FIG. 22, the parity of 40 bits is arranged subsequent to the subcode data. This parity is added by the error code and ID adding unit 5.

Subsequent to the subcode sector, the postamble (FIG. 7) is arranged. As with the preamble, the postamble is also recorded in combination of the pattern A and the pattern B shown in FIG. 8. The postamble has a length of 1500 bits when the head rotation is synchronized with 60×1000/1001 Hz, and has a length of 1375 bits when it is synchronized with 60 Hz.

The system data shown in FIGS. 14 and 15 will be described below in more detail.

As described above, FIG. 14 shows the system data having a fixed length along with the keyword number. For example, tape position information (ATNF) corresponding to the keyword number 4 represents system data having a fixed length, which is made up of an absolute position (ATN=Absolute Track Number) of 23 bits, a break flag (B flag) of 1 bit, and edit information of 8 bits.

The absolute position (ATN) indicates the distance (absolute position) of the track from the tape head.

The B flag is a flag set to "0" when the absolute position (e.g., number) is continued, and set to "1" when the absolute position is not continued. By so setting the B flag, it is possible to assign the monotonously increasing numbers even in the case where data is recorded in mixed fashion and the absolute position is not continued. Thus, a search can be accurately performed because of no return in the assigned number.

The edit information comprises, as shown in FIG. 26, 8 bits of b7-b0. An I flag is allocated to b7. The I flag is set to "1" when information indicating a location to make a search (i.e., information indicating a location that is designated at the time of recording) is contained in the main sector corresponding to the subcode sector. A search position is detected based on the I flag.

A P flag is allocated to b5. The P flag is set to "1" when recording start video data for a still picture is contained in the main sector corresponding to the subcode sector. A position at which a still picture is recorded is detected based on the P flag.

An EH flag is allocated to b4. The EH flag is set to "1" when an I or P picture is recorded in the main sector corresponding to the subcode sector. Usually, editing, such as splicing between scenes on the tape, is started from an I or P picture. An edit position can be therefore detected based on the EH flag.

Figure 27:
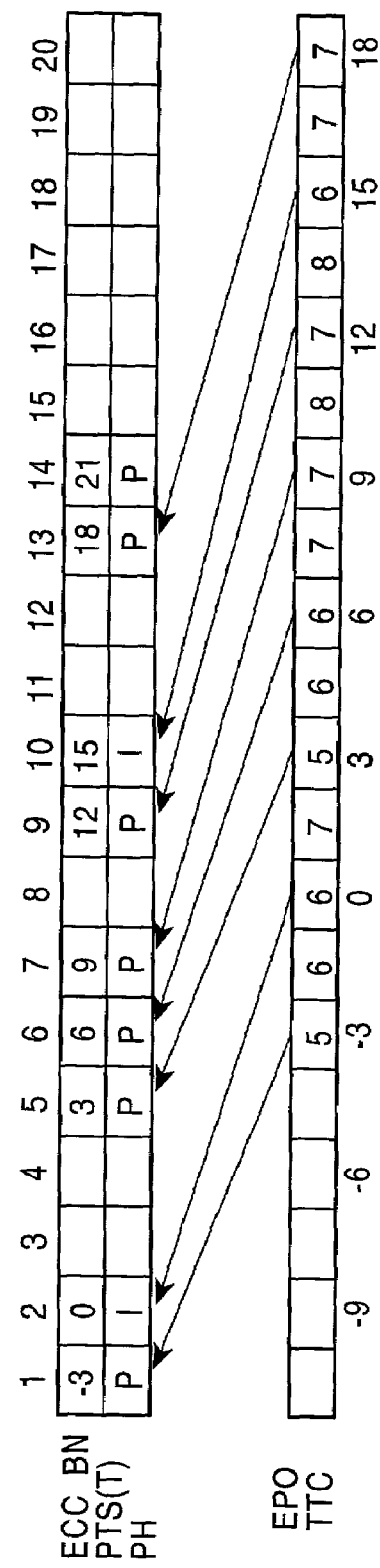
FIG. 27 is a representation for explaining an EPO.

An edit picture header offset (EPO) is allocated to the remaining b3-b0. The EPO indicates the position of the main sector, to which the subcode sector corresponds, in units of 16 tracks. The EPO will be described in more detail with reference to FIG. 27. In an example of FIG. 27, the value of EPO is 5 for a subcode sector in which the TTC has a value 0, and this subcode sector is arranged in a predetermined track in which the ECC number (number assigned in units of 16 tracks) is 6. It is therefore understood that the main sector, to which the above subcode sector corresponds, is arranged in a track preceding the relevant track, in which the subcode sector is arranged, by the EPO value 5×16 tracks. Accordingly, it is possible to detect in which main sector an I or P picture serving as an edit point is actually recorded.

The above-mentioned system data is recorded in the main sector and the subcode sector as described above.

The AUX data having a variable length, shown in FIG. 15, will be described below. The AUX data is recorded only in the main sector.

For example, ECCTB (track block) corresponding to the keyword number 80 represents a packet including plural items of AUX data denoted by marks O in FIG. 28, including the length-fixed AUX data (such as the data position information (ATNF) and TTC) shown in FIG. 14. The packet includes, by way of example, as 3-byte audio mode, an audio frame size (3 bits), sample frequency (3 bits), etc., as shown in FIG. 29. Also, the packet includes, as video mode, a video rate (24 bits), etc., as shown in FIG. 30. Further, the packet includes, as DATA-H, information indicating the type of picture, etc., as shown in FIG. 31.

The operation of the apparatus shown in FIG. 2 will be described below. An HD video signal is inputted to the video data compressing unit 1 together with search video data (thumbnail video data), in which it is compressed by MP@HL or MP@H-14, for example. An audio signal is inputted to the audio data compressing unit 2 and compressed therein. Subcode data, AUX data, a header, etc. are supplied to the terminal 3 from the controller 13.

The switch 4 is controlled by the controller 13 to take in video data (including search video data) outputted from the video data compressing unit 1, audio data outputted from the audio data compressing unit 2, and system data inputted through the terminal 3 at the predetermined timing, and then deliver those data to the error code and ID adding unit 5 for merging thereof.

The error code and ID adding unit 5 adds an ID of 24 bits to each of sync blocks of the main sector shown in FIG. 9. Also, the error code and ID adding unit 5 calculates and adds a parity C1, shown in FIG. 9, for each sync block. Further, for 18 ones of 141 sync blocks, the error code and ID adding unit 5 adds a parity C2 in place of an SB header and main data.

Furthermore, the error code and ID adding unit 5 calculates and adds an ID of 24 bits and a parity of 40 bits for each subcode sync block of the subcode data, as shown in FIG. 22.

In addition, the error code and ID adding unit 5 holds data in amount corresponding to 16 tracks in the main sector and interleaves those data among the 16 tracks.

The 24–25 converter 6 converts the data supplied from the error code and ID adding unit 5 in units of 24 bits into data in units of 25. As a result of this 24–25 conversion, components of the tracking pilot signals having frequencies f1 and f2, shown in FIGS. 4 to 6, appear at enhanced levels.

The sync generator 7 adds a sync of 16 bits to each of the sync blocks of the main sector, as shown in FIG. 9. Also, the sync generator 7 adds a sync of 16 bits to each of the subcode sync blocks of the subcode sector, as shown in FIG. 22. Further, the sync generator 7 generates the run patterns, shown in FIG. 8, for a preamble and a postamble.

More particularly, addition (merging) of those data is carried out by the controller 13 changing over the switch 8 so that the data outputted from the sync generator 7 and the data outputted from the 24–25 converter 6 are selected at the appropriate timing for supply to the modulator 9.

The modulator 9 modulates the inputted data by a method adaptable for the DV format, and outputs modulated data to the parallel/serial converter 10. The parallel/serial converter 10 converts the inputted parallel data into serial data, and supplies the serial data to the rotary head 12 through the amplifier 11. The rotary head 12 records the inputted data on the magnetic tape 21.

Figure 32:
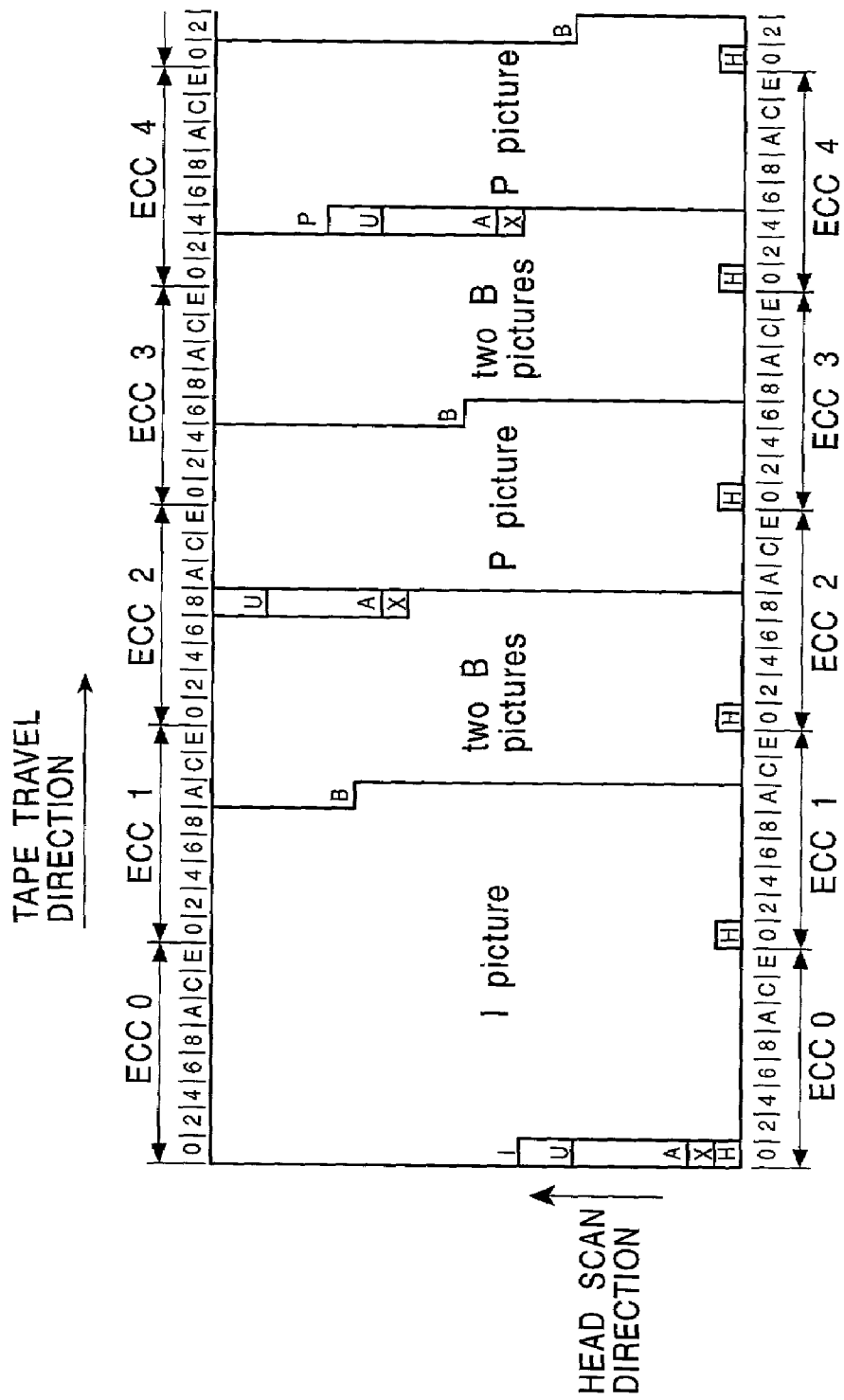
FIG. 32 is a representation for explaining data in a recorded state.

FIG. 32 represents data, which has a GOP (Group of Picture) structure with N=15 (an I picture is arranged for each 15 pictures) and M=3 (a P picture is arranged for each 3 pictures), in a state where the data is recorded on the magnetic tape 21 after being processed as described above. More specifically, pictures in number indicated by a value of M are set as one unit, and AUX data (denoted by U in FIG. 32) related to those pictures, audio data (denoted by A in FIG. 32) corresponding to those pictures, and AUX data (denoted by X in FIG. 32) related to the audio data are arranged together at the head of 16 tracks that undergo interleaving. Subsequent to those data, one unit of pictures (3 pictures in the illustrated example) is arranged.

In other words, since AUX data having a variable length is prepared and recorded in the main sector, it is possible to record such AUX data together for each unit comprising a predetermined number of pictures. As a result, the AUX data can be recorded with high efficiency.

Also, since the subcode sector records therein an EPO indicating the distance up to the main sector corresponding to the AUX data (data having a fixed length) recorded in that subcode sector, the corresponding main sector can be easily detected.

Figure 33:
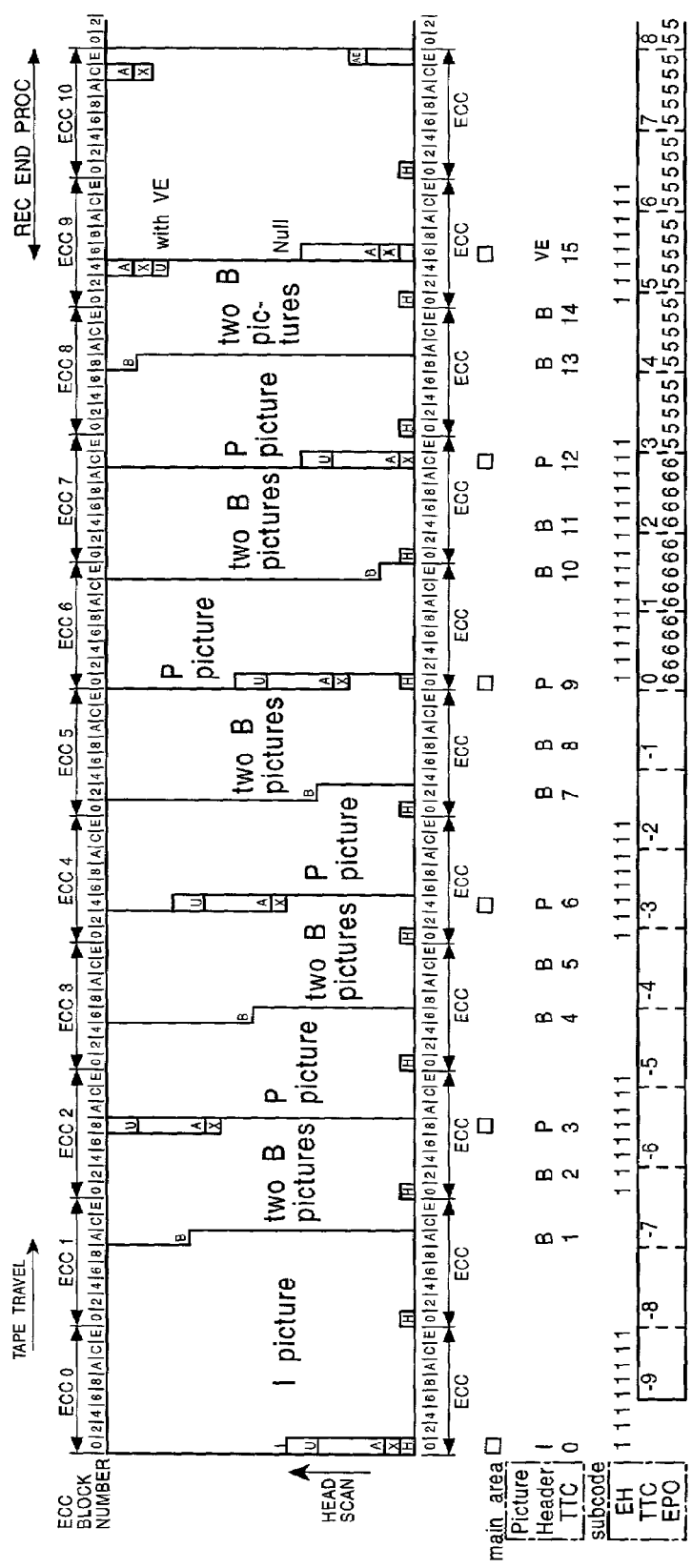
FIG. 33 is a representation for explaining a process for detecting a main sector corresponding to a subcode sector.

FIG. 33 shows, by way of example, the case where the corresponding main sector is detected by correcting an object value of the TTC based on the EPO and then utilizing a corrected value.

The EPO can be determined by the following formula:

$$EPO = \text{recording track number of subcode\_TTC at edit point}/16 - \text{recording track number of main PIC\_TTC corresponding to subcode\_TTC}/16$$

In the above formula, 1/16 is multiplied for conversion into the ECC block number. Also, since subcode_TTC records the same data repeatedly for each 10 tracks, an offset value is obtained in average frame units.

Accordingly, a target position can be detected in advance during search travel (at the time when reaching the object TTC). In this case, however, history information for the offset is required (that is to say, the ECCTB must be prepared to shorten a pre-playback time).

Since the ECCTB (denoted by H in the drawings) is arranged at the head of 16 tracks that undergo interleaving, a time of pre-playback performed for, e.g., splicing between scenes on the tape can be shortened. Stated otherwise, the AUX data required for pre-playback is inherently recorded in the subcode, but as described above, the subcode sector is arranged with a time lag relative to the corresponding main sector. Referring to such AUX data therefore prolongs a pre-playback time correspondingly.

FIG. 34 shows collectively the AUX data (U) related to the pictures, the AUX data (X) related to the audio data, the ECCTB, and the data contained in the subcode.

Figure 35:
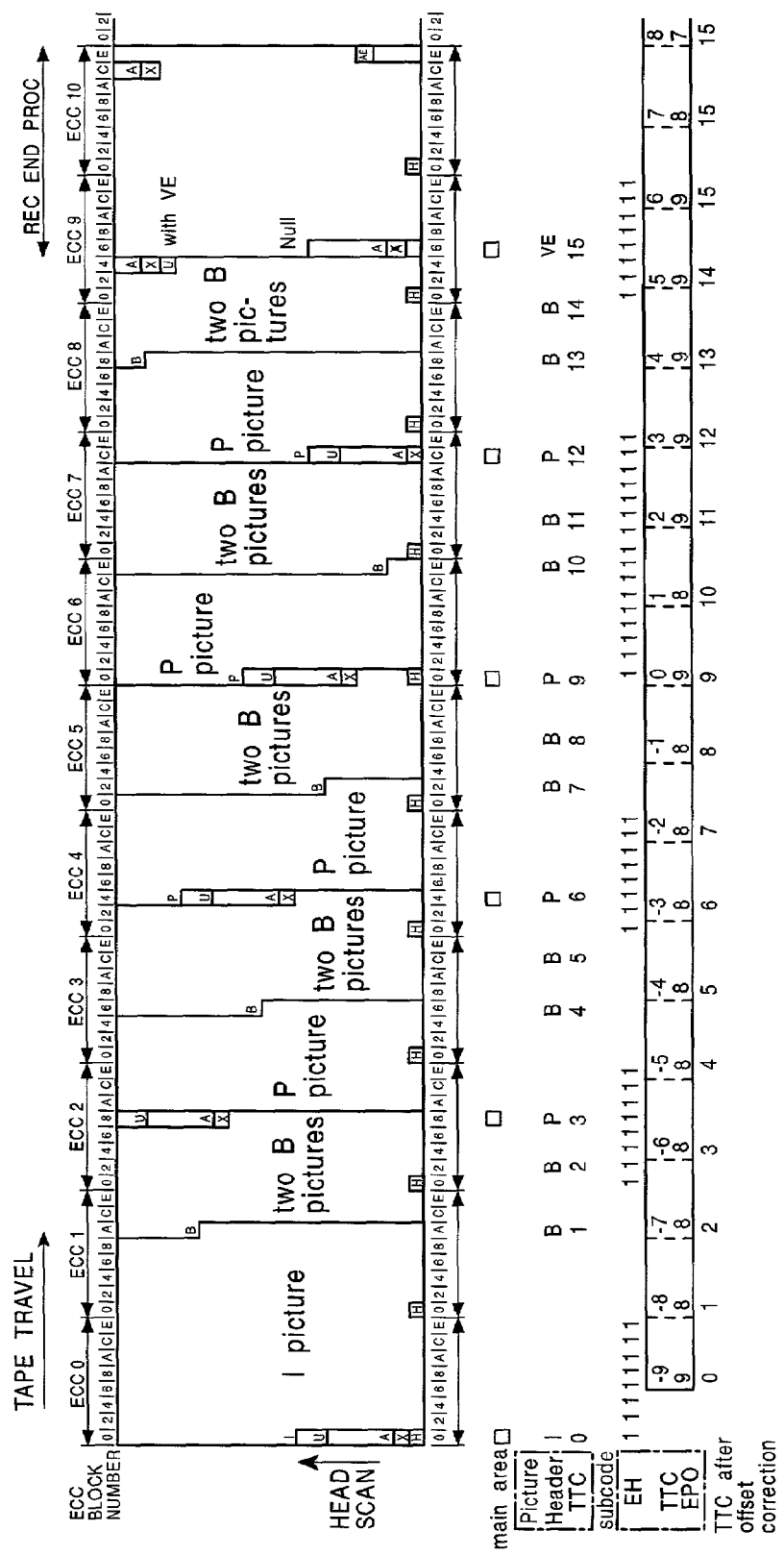
FIG. 35 is another representation for explaining a process for detecting a main sector corresponding to a subcode sector.

FIG. 35 shows another example of generating the EPO in a different manner. In this example, the EPO can be determined by the following formula:

$$EPO = \text{track head in } ECC \ (=\text{subcode\_TTC}-\text{main PIC\_TTC})$$

Accordingly, recording for slicing between scenes on the tape can be performed without history information of the EPO. In this case, however, it is required in search travel to approach the TTC (target position), which has been resulted from the offset correction, after reaching the TTC before the offset correction.

In the example of FIG. 35, the subcode sector in which the TTC has a value 0 is arranged in a track T0 of EEC6 (the EEC number being 6). Stated otherwise, the corresponding main sector, which is arranged in a track T0 of ECC0, can be detected by going back from the track T0 of EEC6 by 9×16 tracks. Additionally, since the subcode sector arranged in each track of ECC6 corresponds to the main sector where an I picture is recorded, the EH header for the subcode sector is set to "1".

FIG. 36 shows one example of construction of a playback system for reproducing the data recorded on the magnetic tape 21 as described above.

The rotary head 12 reproduces the data recorded on the magnetic tape 21 and outputs the reproduced data to an amplifier 41. The amplifier 41 amplifies and supplies the inputted signal to an A/D converter 42. The A/D converter 42 converts the inputted analog signal into a digital signal and supplies it to a demodulator 43. The demodulator 43 demodulates the data supplied from the A/D converter 42 by a method corresponding to the modulation method used in the modulator 9 of FIG. 2.

From the data demodulated by the demodulator 43, a sync detector 44 detects the sync for each sync block of the main sector shown in FIG. 9 and the sync for each subcode sync block of the subcode sector shown in FIG. 22 for supply to an error correcting and ID detecting unit 46. A 25-24 converter 45 converts the data supplied from the demodulator 43 in units of 25 bits into data in units of 24 bits corresponding to the conversion made in the 24–25 converter 6 of FIG. 2, and outputs converted data to the error correcting and ID detecting unit 46.

The error correcting and ID detecting unit 46 executes an error correcting process, an ID detecting process, and an interleaving process based on the syncs inputted from the sync detector 44.

A switch 47 is controlled by the controller 13 and outputs, of data outputted from the error correcting and ID detecting unit 46, video data (including search video data) to a video data decompressing unit 48, audio data to an audio data decompressing unit 49, and system data, such as subcode data and AUX data, to the controller 13 through a terminal 50.

The video data decompressing unit 48 decompresses the inputted video data and outputs it as an analog HD video signal after D/A conversion. The audio data decompressing unit 49 decompresses the inputted audio data and outputs it as an analog audio signal after D/A conversion.

The operation of the playback system thus constructed will be described below. The rotary head 12 reproduces the data recorded on the magnetic tape 21 in the form shown in FIG. 32. The reproduced data is amplified by the amplifier 41 and then supplied to the A/D converter 42. Digital data converted from the analog data by the A/D converter 42 is inputted to and demodulated by the demodulator 43.

The 25-24 converter 45 converts the demodulated data from the demodulator 43 in units of 25 bits into data in units of 24, and outputs the converted data to the error correcting and ID detecting unit 46.

From the data outputted from the demodulator 43, the sync detector 44 detects each sync of the main sector shown in FIG. 9 and each sync of the subcode sector shown in FIG. 22 for supply to the error correcting and ID detecting unit 46. The error correcting and ID detecting unit 46 stores data in amount corresponding to 16 tracks and executes the interleaving process, and also executes the error correcting process using each parity C1, C2 of the main sector shown in FIG. 9. Further, the error correcting and ID detecting unit 46 detects each SB header of the main sector, and determines which one of audio data, video data, AUX data, search video data, etc. is contained in each sync block.

In addition, the error correcting and ID detecting unit 46 executes the error correcting process of the subcode data using each parity of the subcode sector shown in FIG. 22, and detects a packet keyword (header) of the AUX data to determine the contents of the subcode data. It is hence determined whether the subcode data represents the track number or the time code number.

Based on the SB header detected by the error correcting and ID detecting unit 46, the switch 47 supplies both the video data and the search video data to the video data decompressing unit 48. The video data decompressing unit 48 decompresses the inputted data by a method corresponding to the compression method used in the video data compressing unit 1 of FIG. 2, and then outputs the decompressed data as a video signal.

Also, the switch 47 outputs the audio data to the audio data decompressing unit 49. The audio data decompressing unit 49 decompresses the inputted audio data by a method corresponding to the compression method used in the audio data compressing unit 2 of FIG. 2, and then outputs the decompressed data as an audio signal.

Further, the switch 47 outputs the AUX data, the subcode data, etc. delivered from the error correcting and ID detecting unit 46 to the controller 13 through the terminal 50.

Thus, the data, including pictures and audio data, recorded in the form shown in FIG. 32 is decompressed.

While the above description has been made, by way of example, in connection with the case of decompressing pictures and audio data recorded on the magnetic tape 21, the decompressed data may be multiplexed to produce MPEG data.

A sequence of the above-described processing can be executed with hardware, but it may also be executed with software. When executing a sequence of the above-described processing with software, a program constituting the software is installed from a storage medium to, e.g., a computer incorporated in dedicated hardware, or a universal personal computer capable of executing various functions when various programs are installed therein.

As shown in FIGS. 2 and 36, such a storage medium may be in the form of package media, such as a magnetic disk 31 (including a floppy disk), an optical disk 32 (including CDROM (Compact Disk—Read Only Memory) and DVD (Digital Versatile Disk)), a magneto-optical disk 33 (including MD (Mini-Disk)), and a semiconductor memory 34, which store the program therein and are distributed separately from a body of the magnetic tape recording/playback apparatus to provide the program to a user. In addition, the storage medium may be a ROM, a hard disk or the like, which stores the program therein and is provided to a user in a state assembled in the apparatus body beforehand.

It is to be noted that the steps describing the program stored in a storage medium can be processed in time series following the sequence described in the specification, but may also be processed in parallel or individually without being always restricted to the time-serial processing.

With the magnetic tape recording apparatus, the magnetic tape recording method, and the storage medium product storing the computer-readable program according to the present invention, as described above, one of video data, audio data or search data and auxiliary data having a variable length and related to any of those data is acquired as first group data, and data containing a subcode related to the first group data is acquired as second group data. The first group data and the second group data are merged such that the first and second group data are continuously arranged on tracks of a magnetic tape without being spaced away from each other. Merged data is supplied for recording on the magnetic tape. Therefore, data having a large amount of information, represented by data of an HD video signal, can be recorded on the magnetic tape in a digital manner.

With the format for a magnetic tape according to the present invention, since the first group data and the second group data are merged such that the first and second group data are continuously arranged on tracks of the magnetic tape without being spaced away from each other, a magnetic tape can be realized which records data requiring a large capacity as represented by data of an HD video signal.

With the magnetic tape playback apparatus, the magnetic tape playback method, and the storage medium product storing the computer-readable program according to the present invention, the auxiliary data is acquired, as first group data, from data reproduced from a magnetic tape with a rotary head, and the data reproduced from the magnetic tape is processed based on the acquired auxiliary data. The HD video data can be therefore played back with certainty.

What is claimed is:

1. A magnetic tape recording apparatus for recording digital data on a magnetic tape with a rotary head, said apparatus comprising:
   first acquiring means for acquiring video data, audio data or search data;
   second acquiring means for acquiring auxiliary data having a variable length and related to the data acquired by said first acquiring means;
   selecting means for selecting, as first group data, one of the data acquired by said first acquiring means and the data acquired by said second acquiring means;
   third acquiring means for acquiring second group data containing a subcode related to said first group data;
   merging means for merging said first group data and said second group data such that said first group data and said second group data are continuously arranged on tracks of said magnetic tape without being spaced away from each other; and
   supplying means for supplying data merged by said merging means to said rotary head to record the merged data on said magnetic tape.

2. A magnetic tape recording apparatus according to claim 1, wherein said first acquiring means acquires, as said first group data, the video data in edit units.

3. A magnetic tape recording apparatus according to claim 1, wherein said second acquiring means acquires, as said second group data, auxiliary data related to the audio data and auxiliary data related to the video data; and
   said merging means merges the auxiliary data related to the audio data, the audio data, the auxiliary data related to the video data, and the video data to be arranged in this order.

4. A magnetic tape recording apparatus according to claim 1, wherein said second acquiring means further acquires auxiliary data required for pre-playback; and
   said merging means merges the auxiliary data required for pre-playback to be arranged at the head of an edit unit of the video data.

5. A magnetic tape recording apparatus according to claim 4, wherein the auxiliary data required for pre-playback includes the contents recorded in a subcode sector.

6. A magnetic tape recording method used in a magnetic tape recording apparatus for recording digital data on a magnetic tape with a rotary head, said method comprising the steps of:
   a first acquiring step of acquiring video data, audio data or search data;
   a second acquiring step of acquiring auxiliary data having a variable length and related to the data acquired by processing in said first acquiring step;
   a selecting step of selecting, as first group data, one of the data acquired by processing in said first acquiring step and the data acquired by processing in said second acquiring step;
   a third acquiring step of acquiring second group data containing a subcode related to said first group data;
   a merging step of merging said first group data and said second group data such that said first group data and said second group data are continuously arranged on tracks of said magnetic tape without being spaced away from each other; and
   a supplying step of supplying data merged by processing in said merging step to said rotary head to record the merged data on said magnetic tape.

7. A storage medium product storing a computer-readable program executed by a computer to perform a method comprising the steps of:
   a first acquiring step of acquiring video data, audio data or search data;
   a second acquiring step of acquiring auxiliary data having a variable length and related to the data acquired by processing in said first acquiring step;
   a selecting step of selecting, as first group data, one of the data acquired by processing in said first acquiring step and the data acquired by processing in said second acquiring step;
   a third acquiring step of acquiring second group data containing a subcode related to said first group data;
   a merging step of merging said first group data and said second group data such that said first group data and said second group data are continuously arranged on tracks of a magnetic tape without being spaced away from each other; and
   a supplying step of supplying data merged by processing in said merging step to a rotary head to record the merged data on said magnetic tape.

* * * * *